(12) United States Patent
Muthukkaruppan et al.

(10) Patent No.: US 9,946,657 B1
(45) Date of Patent: Apr. 17, 2018

(54) SPILLING SMALL CACHE ENTRIES TO A SOLID STATE DEVICE

(71) Applicant: Nutanix, Inc., San Jose, CA (US)

(72) Inventors: Kannan Muthukkaruppan, Union City, CA (US); Neil Le, San Diego, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/057,317

(22) Filed: Mar. 1, 2016

(51) Int. Cl.
*G06F 12/0891* (2016.01)

(52) U.S. Cl.
CPC ...... *G06F 12/0891* (2013.01); *G06F 2212/22* (2013.01); *G06F 2212/69* (2013.01)

(58) Field of Classification Search
CPC ........ G06F 3/061; G06F 3/068; G06F 12/127; G06F 12/12; G06F 12/0804
USPC .................................................. 711/135, 143
See application file for complete search history.

(56) References Cited

U.S. PATENT DOCUMENTS

| | | | | |
|---|---|---|---|---|
| 6,877,081 B2 * | 4/2005 | Herger | ................... | G06F 12/08 710/56 |
| 9,189,402 B1 * | 11/2015 | Smaldone | ............ | G06F 12/121 |
| 9,335,943 B2 * | 5/2016 | Sahita | ................... | G06F 3/0622 |
| 9,658,877 B2 * | 5/2017 | Barwick | ................. | G06F 9/461 |
| 9,703,733 B2 * | 7/2017 | Rozas | ..................... | G06F 13/24 |
| 2010/0257308 A1 * | 10/2010 | Hsu | ..................... | G06F 12/0246 711/103 |
| 2013/0275653 A1 * | 10/2013 | Ranade | ................. | G06F 3/0605 711/103 |
| 2016/0042005 A1 * | 2/2016 | Liu | ................... | G06F 17/30132 711/103 |

OTHER PUBLICATIONS

MySQL 5.7 Reference Manual, May 23, 2013, Oracle, 8.9.2.3. Midpoint Insertion Strategy.*
U.S. Appl. No. 14/985,268, filed Dec. 30, 2015, 53 pages.

* cited by examiner

*Primary Examiner* — Sean D Rossiter
(74) *Attorney, Agent, or Firm* — Vista IP Law Group, LLP

(57) ABSTRACT

Systems for managing a multi-level cache in high-performance computing. A method is practiced over a multi-tier caching subsystem that comprises a first cache tier of random access memory, and a second cache tier that comprises a block-oriented device. The solid-state drive device is a block-oriented device comprising a plurality of blocks having a minimum block size. Cache entries are initially stored in the first cache, including cache entries that are smaller than the minimum block size of the block-oriented device. During cache operations such as first tier eviction, a plurality smaller entries are packed into blocks of the minimum block size before being spilled into the second tier. If an entry in the packed block is accessed again, the entire packed block is brought into the first tier. A key structure is maintained to track individual invalidated entries in a packed block without invalidating other entries in the packed block.

20 Claims, 16 Drawing Sheets

SPILLING SMALL CACHE ENTRIES TO A SOLID STATE DEVICE

FIELD

This disclosure relates to high-performance computing, and more particularly to techniques for a caching system to manage entry, compaction, eviction, and reclamation of cached entries using a block-oriented cache tier.

BACKGROUND

In many computing systems that implement caching, a cache supports multiple cache levels (e.g., L1, L2, L3, etc.). Many cache systems spill from one cache level to another cache level, when the data in the cache is measured or deemed to be less likely to be retrieved again (e.g., due to age in the cache, or due to being already processed, or due to any other reason). Some caching systems use RAM as the first tier of cache and solid-state devices as the next tier. Often a caching system is implemented in the context of computing system hardware that has a natural size of an item in cache. For example, an instruction cache might exhibit a natural size for such an instruction cache entry that is the same size as an instruction. Or, for example, a content cache that brings in cache entries from a block-oriented device such as a hard disk drive (HDD) or a solid-state drive (SSD), where the natural size for a cache entry that is the same size as a block from the block-oriented device. In some cases, all or substantially all of the data found within the bounds of a cached item are used in processing (e.g., the entire instruction, or all bytes of a block from a block-oriented device). However, there are many cases where a single block is composed of many smaller units of individually addressable data items. For example, consider a series of names (e.g., user names, subscriber names, etc.) that are stored end-to-end in as many block as are needed to store the entire series. In such scenarios involving smaller units of individually-addressable data items, even a retrieval (e.g., from the block-oriented device) of just one of the smaller individually-addressable data items would necessitate retrieval of the entire block due to the natural block size of the block-oriented device. The entire block has been retrieved, and the caching system will store the entire block—even though only one unit of the smaller individually-addressable data items has been addressed by the data requestor. When such occurrences are rare, the efficiency impacts to a caching system that inserts and manages such partially-useful blocks is small, however as such occurrences increase in number or ratio, caching the entire-block-for-just-one-small-entry regime becomes commensurately wasteful.

Unfortunately, the wastefulness as just described is exacerbated when the caching system spills over into a block-oriented device such as a solid-state device. As an example, storing a user name of (for example) size=40 bytes would spill over into an SSD block of 4K bytes, which would calculate to a use factor of less than 1% (i.e., >99% wasted space). Legacy approaches to avoid such waste have included evicting small cache items without implementing SSD spillover, however, this often defeats the reason for caching the data item in the first place (e.g., a next access would result in a cache MISS and another retrieval). Other legacy approaches prospectively retain smaller individually-addressable data items in higher levels of cache for longer periods of time than other entries (e.g., without spillover to lower levels of SSD cache), however this technique results in filling up the higher levels of cache with data that might or might not be accessed again—thus using higher-level cache resources that could be used for more frequently accessed data items. Still other caching systems have increased the size of spillover SSD, however, this merely adds to a system's cost without addressing the wastefulness. What is needed is a technique or techniques that facilitate cache spillover of small data items into SSD without incurring the wastefulness as heretofore described.

What is needed is a technique or techniques to improve over legacy approaches.

BRIEF DESCRIPTION OF THE DRAWINGS

The drawings described below are for illustration purposes only. The drawings are not intended to limit the scope of the present disclosure.

DETAILED DESCRIPTION

Figure 1A:
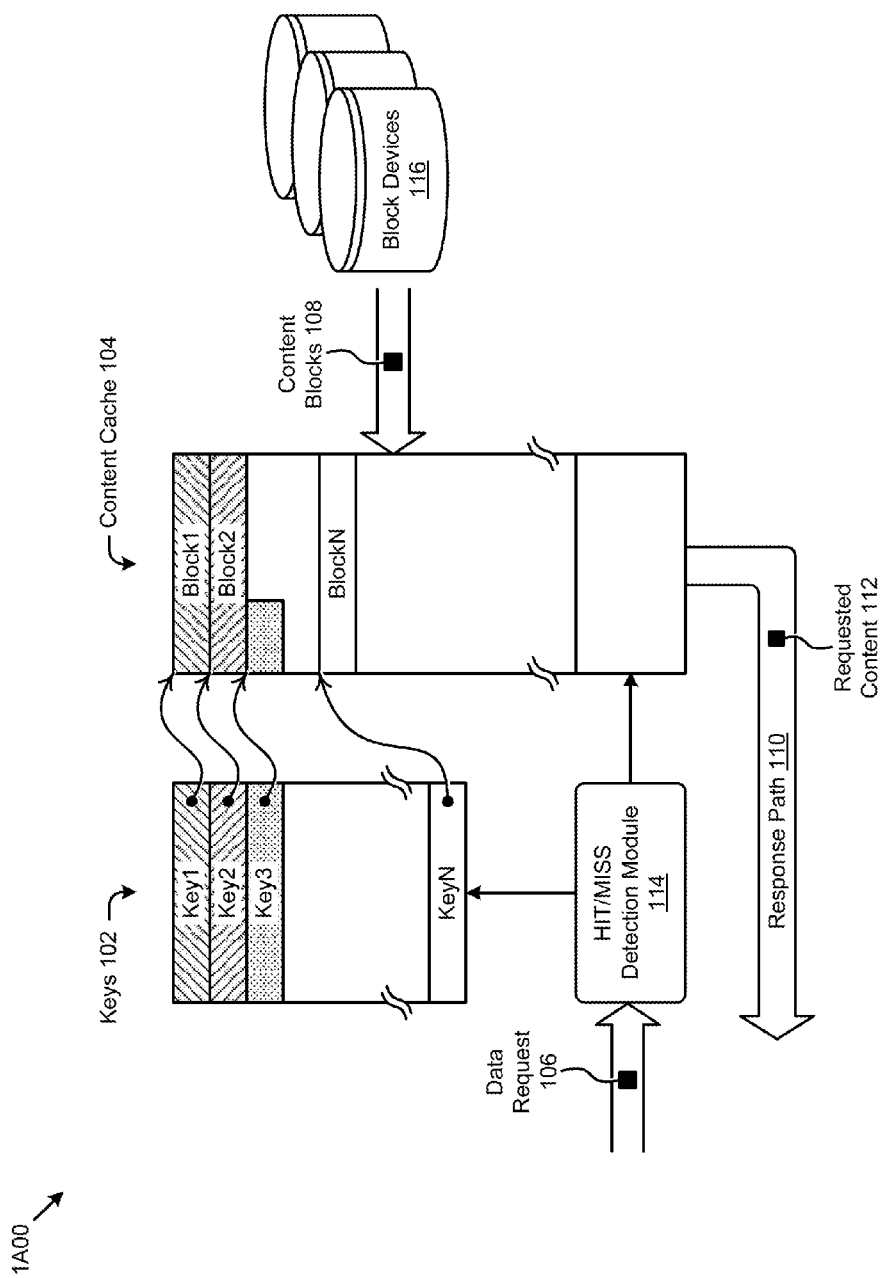
FIG. 1A depicts a content cache environment.

Some embodiments of the present disclosure address the problem of managing storage space use efficiency for small cache entries in cache systems that implement one or more cache tiers using a block-oriented storage device and some embodiments are directed to approaches for managing the lifecycle of small entries to achieve improved storage space use efficiency. More particularly, disclosed herein and in the accompanying figures are exemplary environments, systems, methods, and computer program products for a caching system to manage entry, compaction, and eviction of small cache entries using a block-oriented cache tier.

Overview

In addition to implementing one or more tiers or cache using random access memory (RAM), many caching systems implement a solid-state drive (SSD) spillover at lower levels of the cache hierarchy. When an adding an entry to RAM tiers, one or more older entries spill from the tail of a RAM tier to SSD. This can incur waste (e.g., low space use) when the SSD has a relatively larger natural block size as compared to the size of the cached entry. As described herein below, a more space-efficient approach involves spilling to SSD in blocks comprising multiple smaller entries. For example, at the point in time that a new entry is added to the highest level of cache (e.g., a RAM-based tier), that level is examined for the presence of smaller entries, and a selection of such smaller entries are packed into a single block of the natural size of the spillover SSD. The selection of these smaller entries is thereby spilled over into a single block that exhibits relatively higher use. Furthermore, the selection of these smaller entries can be made on the basis of age and/or based on a best-fit packing algorithm and/or on the basis of a threshold, or any combination therefrom. In some cases the smaller entries can remain in the RAM device (e.g., in a "higher" tier) until evicted. In some situations, the selection of a set of smaller entries can be made on the basis of a calculated likelihood that they will be amalgamated into an SSD device (e.g., in a "lower" tier) in some subsequent entry and eviction operation or operations. As yet another example, a strict least-recently-used (LRU) eviction regime or policy can be relaxed without violating the overall intent of such an LRU policy.

In systems that implement packed SSD block spillover a set of keys and respective locations can be kept in a fast access location such as RAM. As can be understood, a key storage can be maintained such that even when there are multiple copies of the same content in multiple tiers, the keys can be arranged so as to point to the highest level or tier and thereby offer the requestor faster access. Furthermore, in such an organization of keys being separate from content, overwrites can be made to the entry that is at the highest level of cache. Other copies of the same content can be marked as invalidated by changing the key structure that points to the lower-level (now invalidated) copies. At some moment in time all or most or many of the smaller entries that have been packed into an SSD block will become marked as invalidated and the SSD block can be reclaimed. In situations when many but not all of the smaller entries that have been packed into an SSD block that is to be reclaimed, a utilization metric can be calculated or consulted. When they are in fact marked as invalidated, the smaller entry or entries can be brought into a higher tier (e.g., non-SSD tier) of the multi-level cache. Such a smaller entry or entries can be inserted into the higher tier at a top-end (e.g., a "hot" end) or at a low-end (e.g., a "cold" end), or can be inserted somewhere in the middle.

Implementations that follow the disclosure as given herein do not need any background compactions or scans of the entire cache to reclaim space. Packing, invalidation, and release of unused SSD blocks can happen as a natural consequence of processing cache events.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts a content cache environment 1A00. As an option, one or more variations of content cache environment 1A00 or any aspect thereof may be implemented in the context of the architecture and functionality of the embodiments described herein. Also, the content cache environment 1A00 or any aspect thereof may be implemented in any environment.

As shown, the content cache environment 1A00 includes a data structure to form the content cache 104, a set of keys 102, and a HIT/MISS detection module 114 that has access to both the keys and content cache. In operation, a data request 106 is received from a requestor, the HIT/MISS detection module determines if the data item requested is present in the content cache and, if so, a cached copy of the requested data item is returned to the requestor (see requested content 112 communicated over response path 110). In cases when the requested content is not present in the content cache 104, a separate repository is consulted. The aforementioned separate repository can be a different subsystem, possibly involving one or more block devices 116 that return data items as content blocks 108.

Entries in a content cache can be accessed repeatedly by one or more requestors. In such a case, entries remain "hot" in the cache. Other entries might not be repeatedly accessed and might become "stale" or "cold". Entries can "age-out" or otherwise be deemed to be no longer useful in the content cache. In such cases, the entry can be evicted from the content cache. A subsequent access for an "aged-out" data item might require another retrieval from block devices 116. In some cases, "cold" data items can be evicted from one portion of a cache (e.g., an area of random access memory (RAM)) to another portion of cache (e.g., to a local solid-state storage device (SSD)). Some content cache architectures implement multiple tiers, possibly involving one or more higher tiers implemented using RAM, and one or more lower tiers implemented using SSD. As is understood, solid-state storage devices are often implemented as block-oriented storage repositories having block sizes on the order of 1 KB, 2 KB, 4 KB, 8 KB, etc.). Reading and writing to and from such block-oriented storage repositories incurs the costs (e.g., bandwidth consumption, latency, etc.) corresponding to a minimum amount to process the entire block, even if only (for example) a few bytes (e.g., a small entry) are of interest in that block.

Figure 1B:
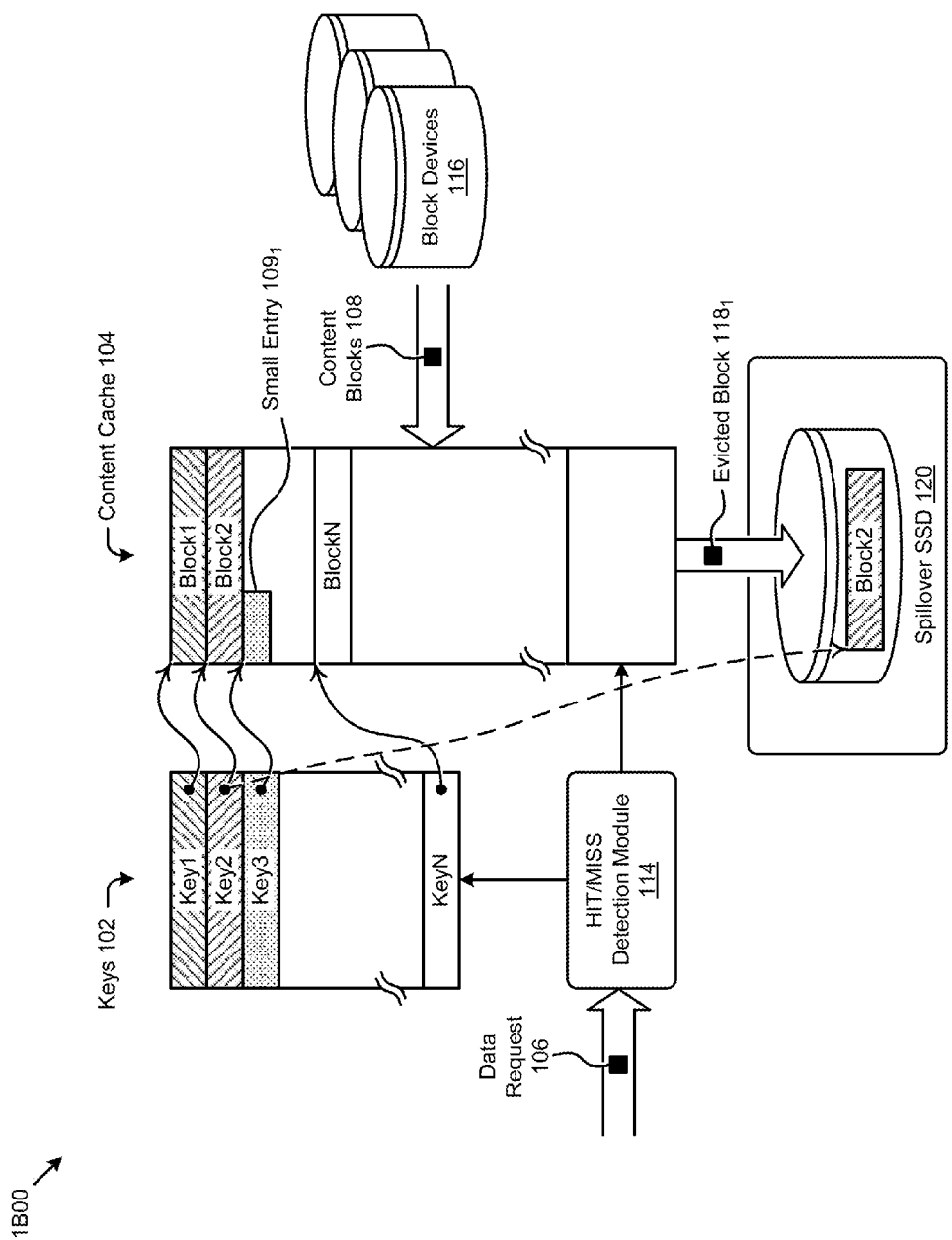
FIG. 1B shows a multi-tier content cache having a block-oriented spillover device.

FIG. 1B shows a multi-tier content cache 1B00 having a block-oriented spillover device. As an option, one or more variations of multi-tier content cache 1B00 or any aspect thereof may be implemented in the context of the architecture and functionality of the embodiments described herein. Also, the multi-tier content cache 1B00 or any aspect thereof may be implemented in any environment.

The embodiment shown in FIG. 1B is merely one example of a content cache that implements a spillover SSD 120. A frequently occurring I/O (input/output or IO) size for SSD spills is a block size multiple (2 KB, 4 KB, 8 KB, etc.). In some environments and/or in some applications, data is naturally "large" and a "large" cache entry size (e.g., 4 KB) is a frequently occurring I/O size granularity. Spilling "large" data items (e.g., Block2) to content cache's "large" block-oriented devices can be performed on a one-to-one basis. In such cases, since the size of the entry is the same size as a block of the block-oriented devices, there is no wasted space when a block is evicted (e.g., see evicted block $118_1$) from a RAM tier to an SSD tier. However, when the size of a cached data item is a small entry (e.g., much smaller than a block of the block-oriented device), the difference between the block size and the size of the small entry $109_1$ is unused and thus incurs wasted space.

Figure 1C:
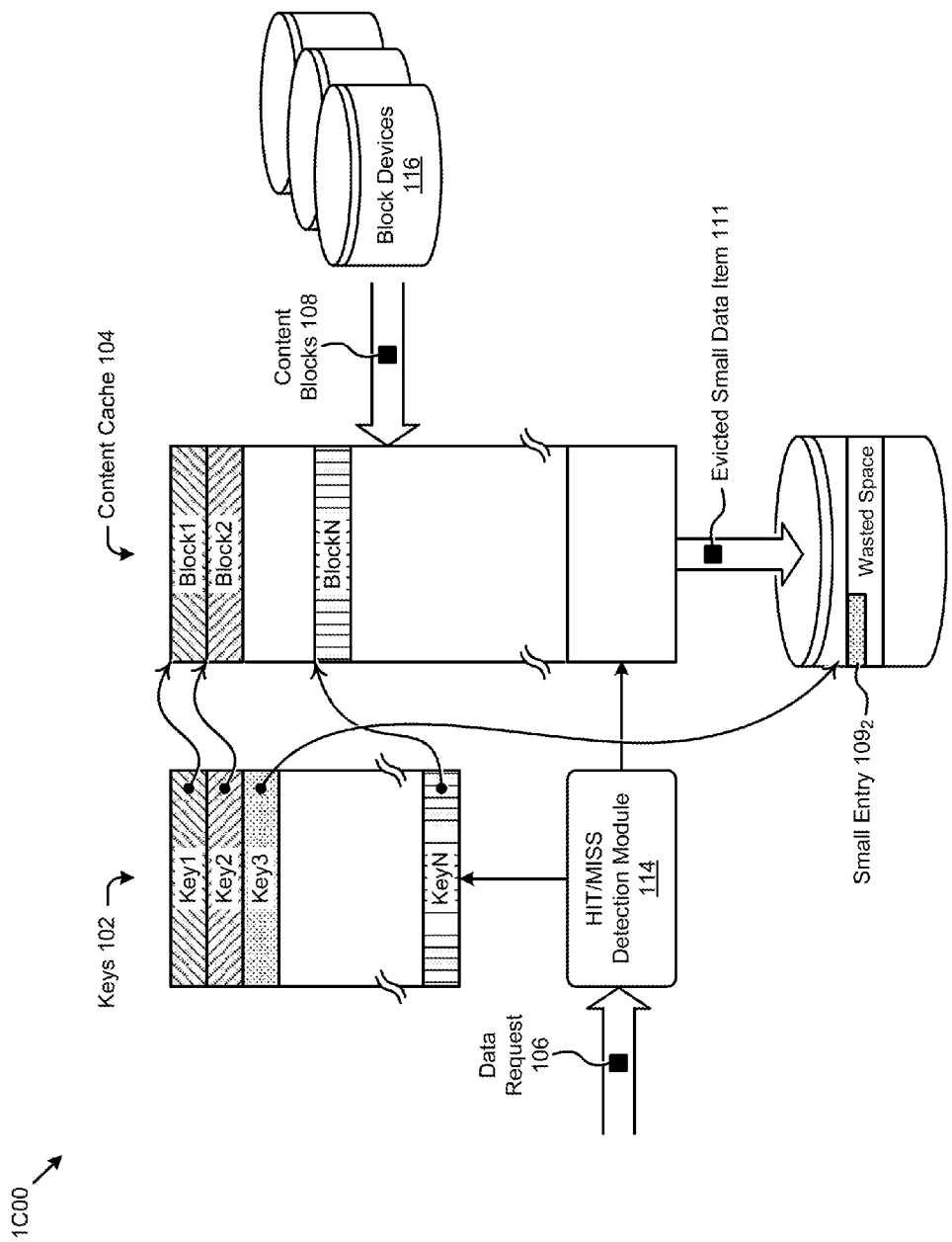
FIG. 1C depicts wasted space in spillover data structures when performing multi-tier content cache operations, according to an embodiment.

FIG. 1C depicts wasted space in spillover data structures when performing multi-tier content cache operations 1C00. As an option, one or more variations of multi-tier content cache operations 1C00 or any aspect thereof may be implemented in the context of the architecture and functionality of the embodiments described herein. Also, the multi-tier content cache operations 1C00 or any aspect thereof may be implemented in any environment.

In some environments and in some applications, data items can be relatively small (e.g., relatively smaller than the block size of the spillover cache tier). It is wasteful to spill such relatively smaller entries into pages. As shown, when a small data item is evicted, such as evicted small data item 111, a small entry $109_2$ is stored in the SSD tier. The act of writing the small entry $109_2$ into the SSD tier incurs the costs of writing the entire larger block. One technique that can be used to decrease wasted space and decrease wasteful accesses to SSD tiers is to pack multiple small entries into a block. Such a technique is shown and described as pertaining to FIG. 2.

Figure 2:
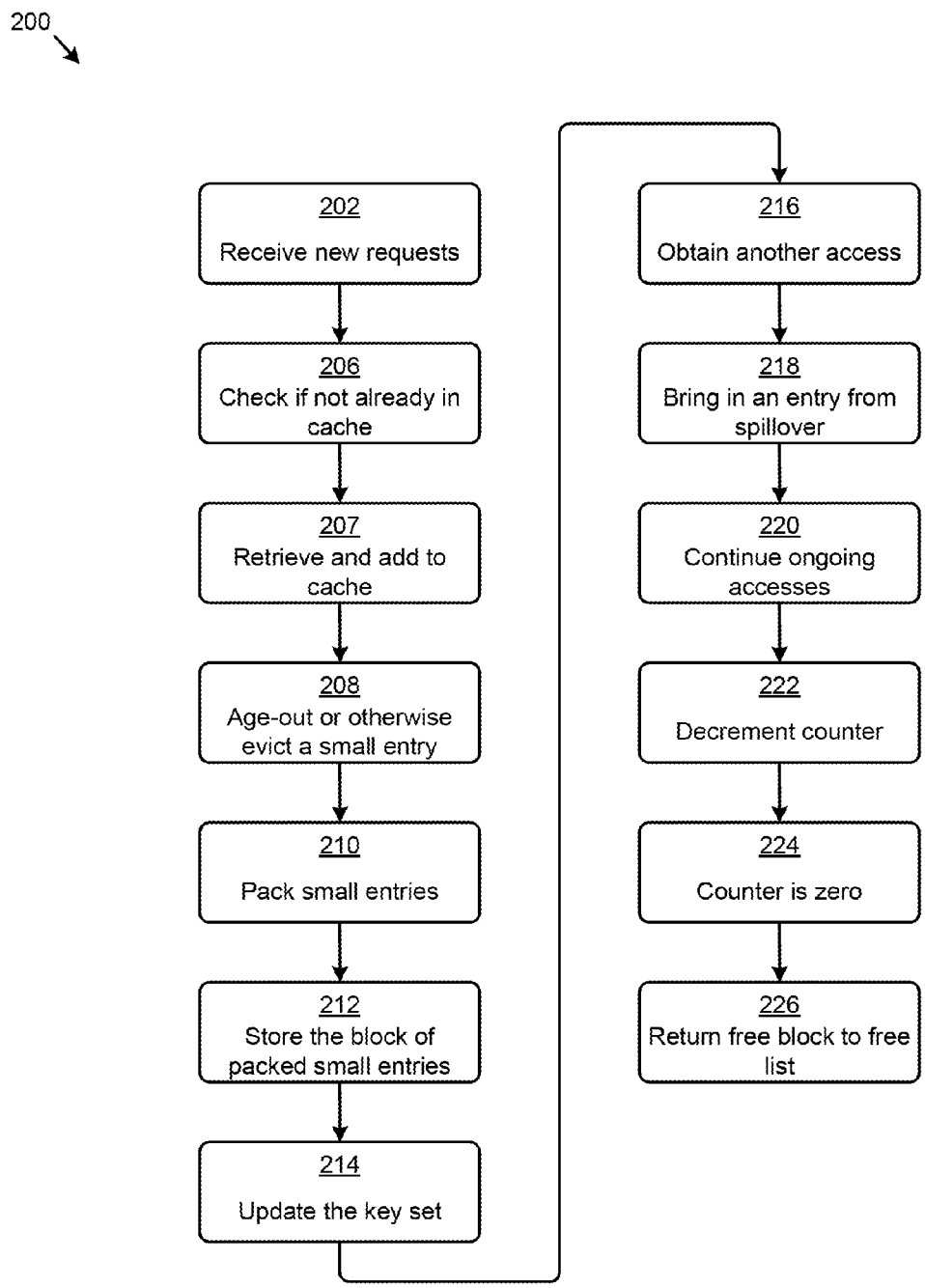
FIG. 2 is a flowchart showing operations performed within a caching system that manages entry, compaction and eviction of small cache entries using a block-oriented cache tier, according to an embodiment.

FIG. 2 is a flowchart 200 showing operations performed within a caching system that manages entry, compaction and eviction of small cache entries using a block-oriented cache tier. As an option, one or more variations of flowchart 200 or any aspect thereof may be implemented in the context of the architecture and functionality of the embodiments described herein. Also, the flowchart 200 or any aspect thereof may be implemented in any environment.

The depiction in FIG. 2 is merely an overview. Further details pertaining to the operations are given in subsequent figures. As shown, the first operation of the series of operation operations is entered upon receiving an incoming request (see operation 202). If the incoming request is for a data item that is not already in cache (see operation 206), then the requested data item entry is retrieved and added to the cache (see operation 207). A key or portion of a key is constructed and stored in a data structure such as keys 102. The keys can be randomly accessed (e.g., via a hashing algorithm) and determining the location of a key also locates the pointer or pointers to the data item at its location in cache. When it comes time to evict some items from RAM and/or other conditions are present that indicate an operation to evict some items from RAM (e.g., to make space for new items in RAM), the tail of the RAM is considered and some number of small entries can be packed into a block and spilled to a flash tier.

Figure 4A:
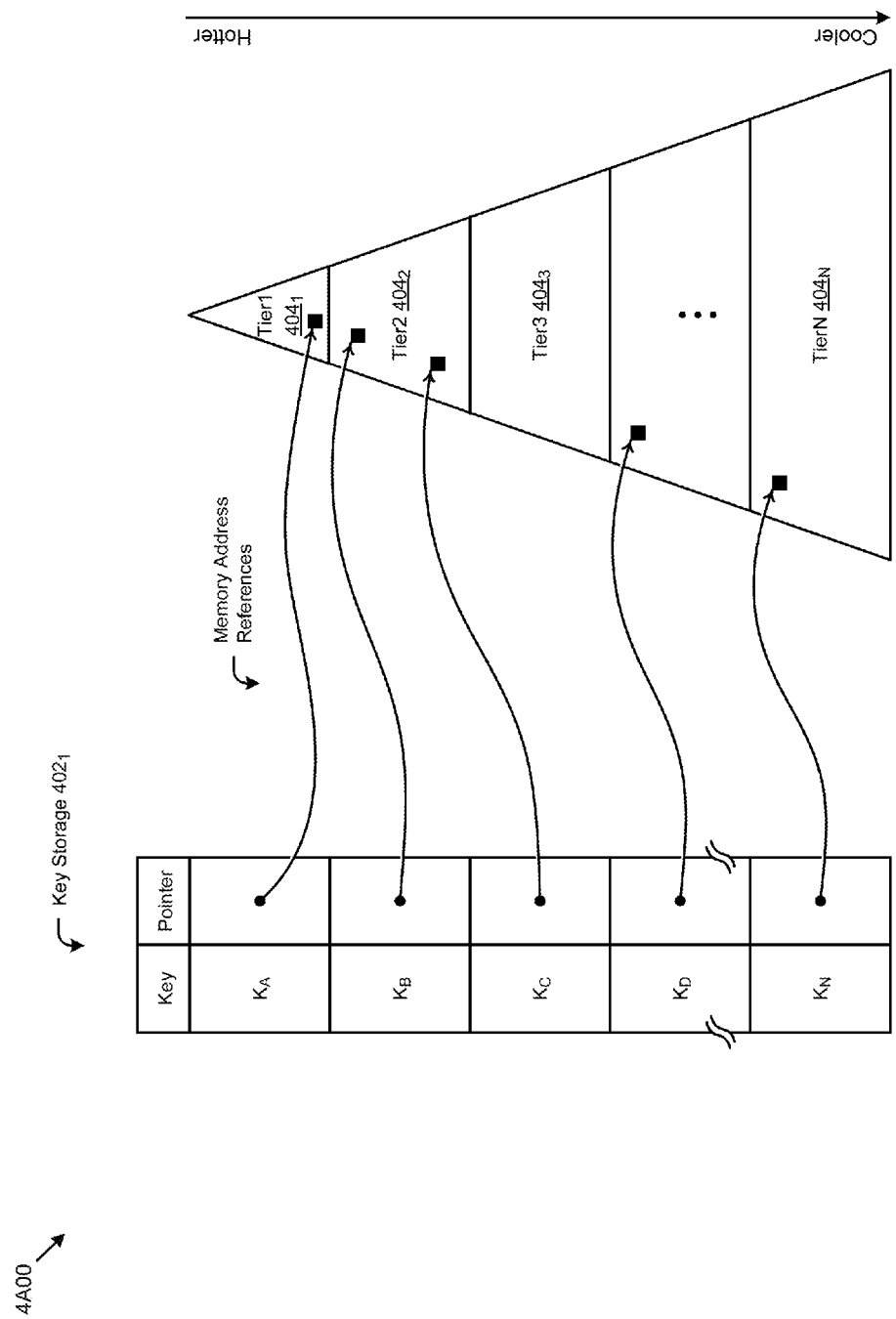
FIG. 4A depicts a key storage data structures used in a multi-tier caching subsystem, according to some embodiments.
Figure 4B:
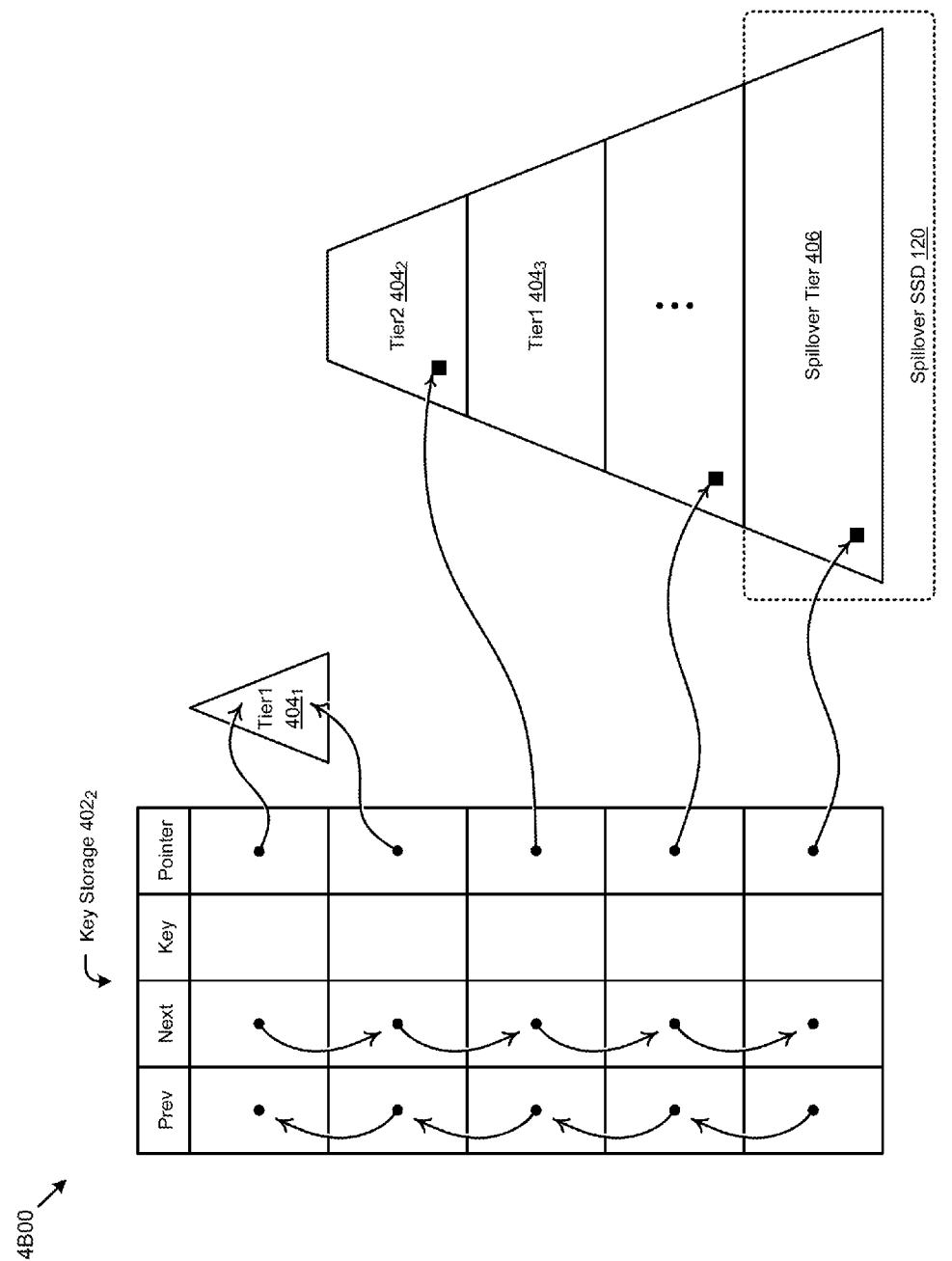
FIG. 4B depicts solid-state storage device spillover tier that is implemented using a block-oriented device, according to an embodiment.
Figure 4C:
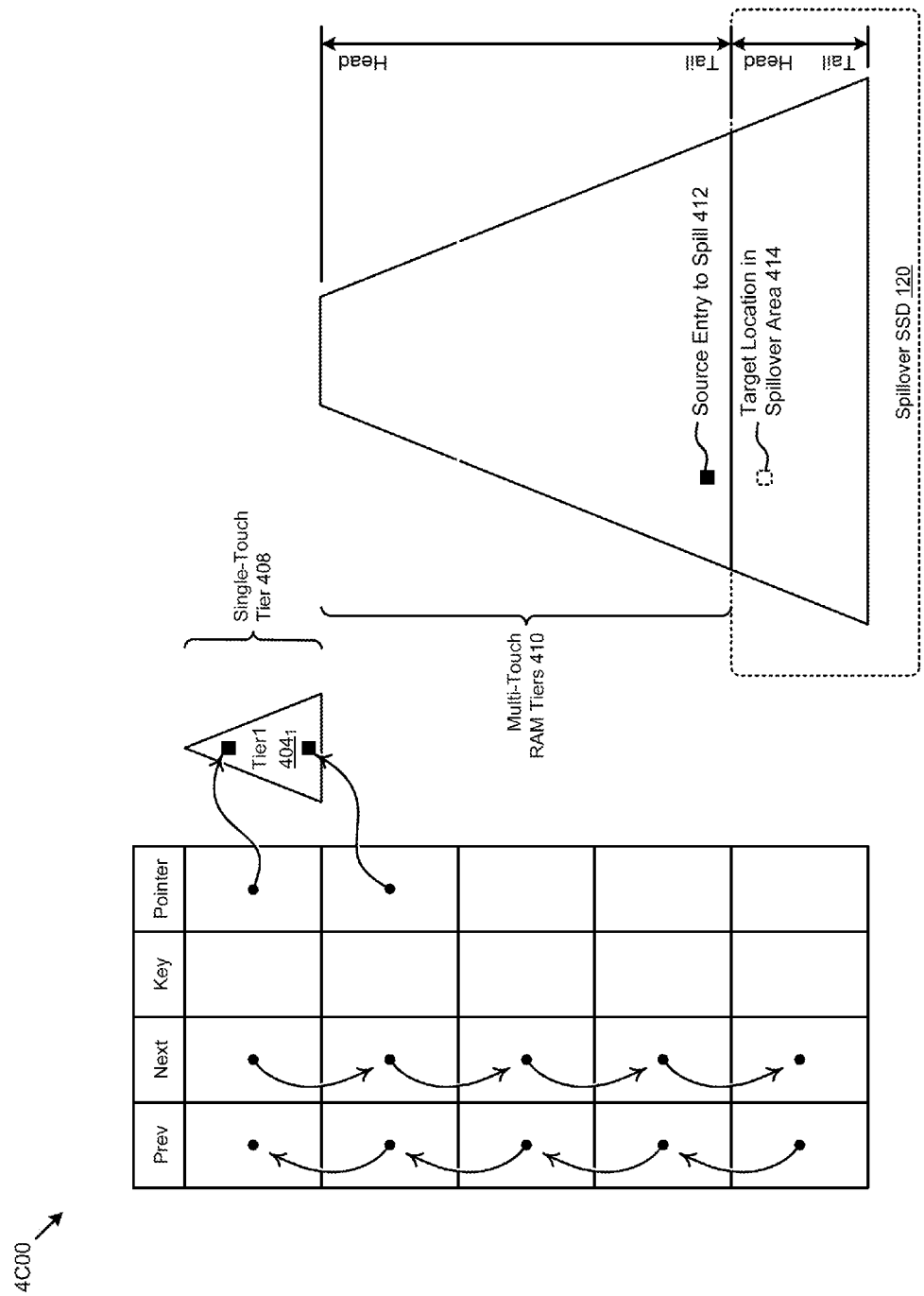
FIG. 4C depicts cache tiers that have respective head ends and tail ends as used in a caching system to manage entry, compaction, eviction and reclamation of small cache entries using a block-oriented cache tier, according to some embodiments.
Figure 4D:
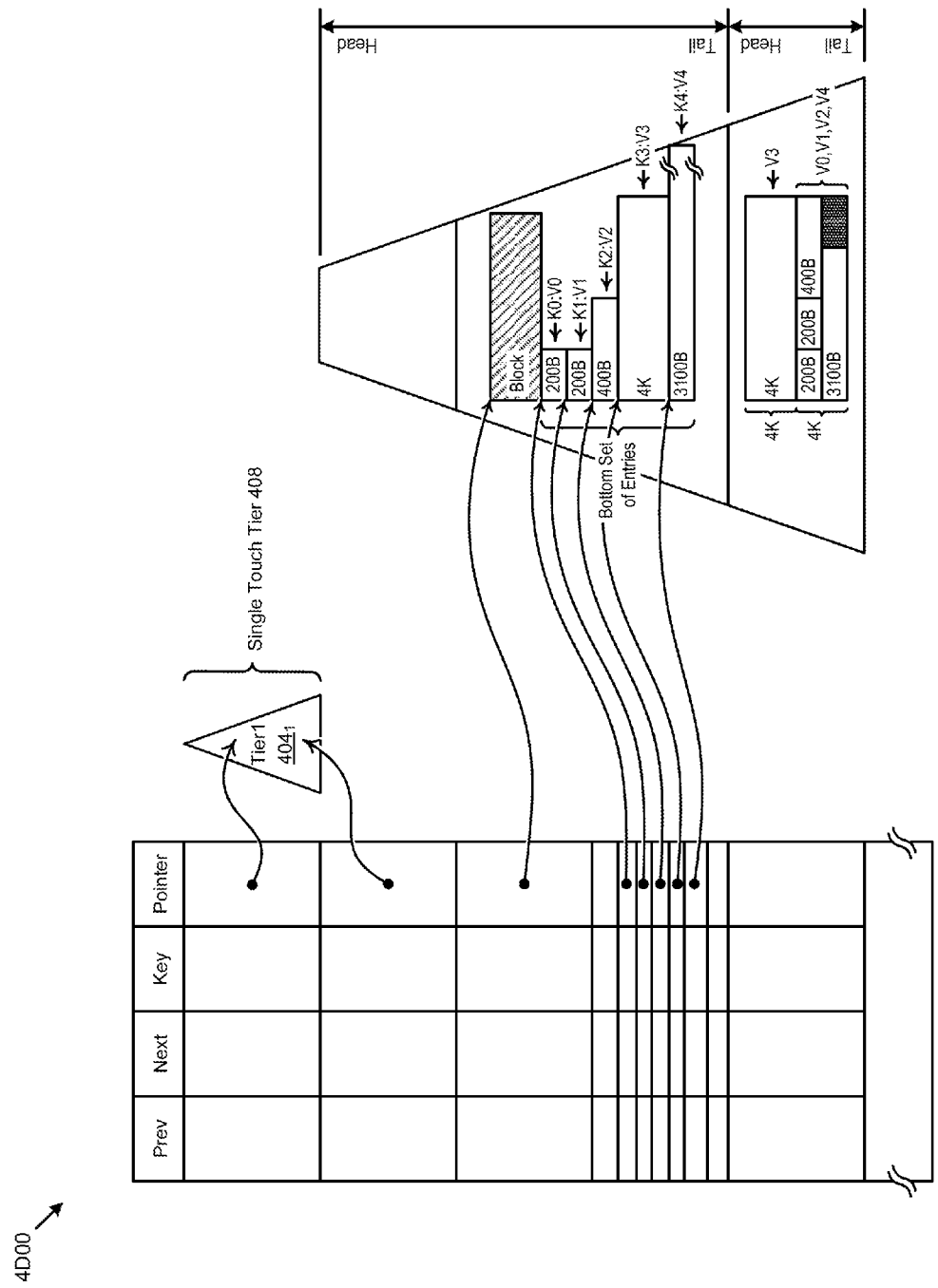
FIG. 4D depicts small entry compaction operations as performed in a caching system that manages entry, compaction, eviction and reclamation of small cache entries using a block-oriented cache tier, according to some embodiments.

As shown, upon determination (see operation 208) that the entry is to be evicted (e.g., with some number of other small entries), an operation for packing the small entry into a block is entered (see operation 210) and the entry is thereby packed (e.g., with some number of other small entries) and saved into a location in the SSD (see operation 212, also see FIG. 4D). When a group of small entries is packed in advance of being evicted to a lower tier, a set of keys that refer to the block composed of the group of small entries is generated to point to the new location of the block in a lower tier (see operation 214). A set of keys comprises any number of keys that individually refer to respective small entries that are packed into the block. Such a key within a set of keys can be composed of a block address and an offset to the small entry. Conversely, when accesses are made to the small entry (e.g., see operation 216), the block from the lower tier is brought up to a higher tier (e.g., see operation 218, also see FIG. 6).

The depicted caching system continues processing ongoing access (see operation 220). Some accesses or sequence of accesses might be of a nature that a particular small entry is invalidated (e.g., when the contents of a small entry at a higher cache tier is overwritten) and, in such a case, a number counter referring to the number of small entries in its respective block is decremented (see decrement counter of operation 222). At some point in time, it is possible that the number counter can be decremented down to zero (see operation 224), meaning that the block no longer contains any small entries, and the caching system invokes operation 226 in which processing is performed for returning the now free block to a free list.

In addition to the aforementioned RAM cache tiers, and in addition to the aforementioned SSD cache tiers, some caching systems include a highest-level "single-touch tier", which is shown and described in the following FIG. 3.

Figure 3:
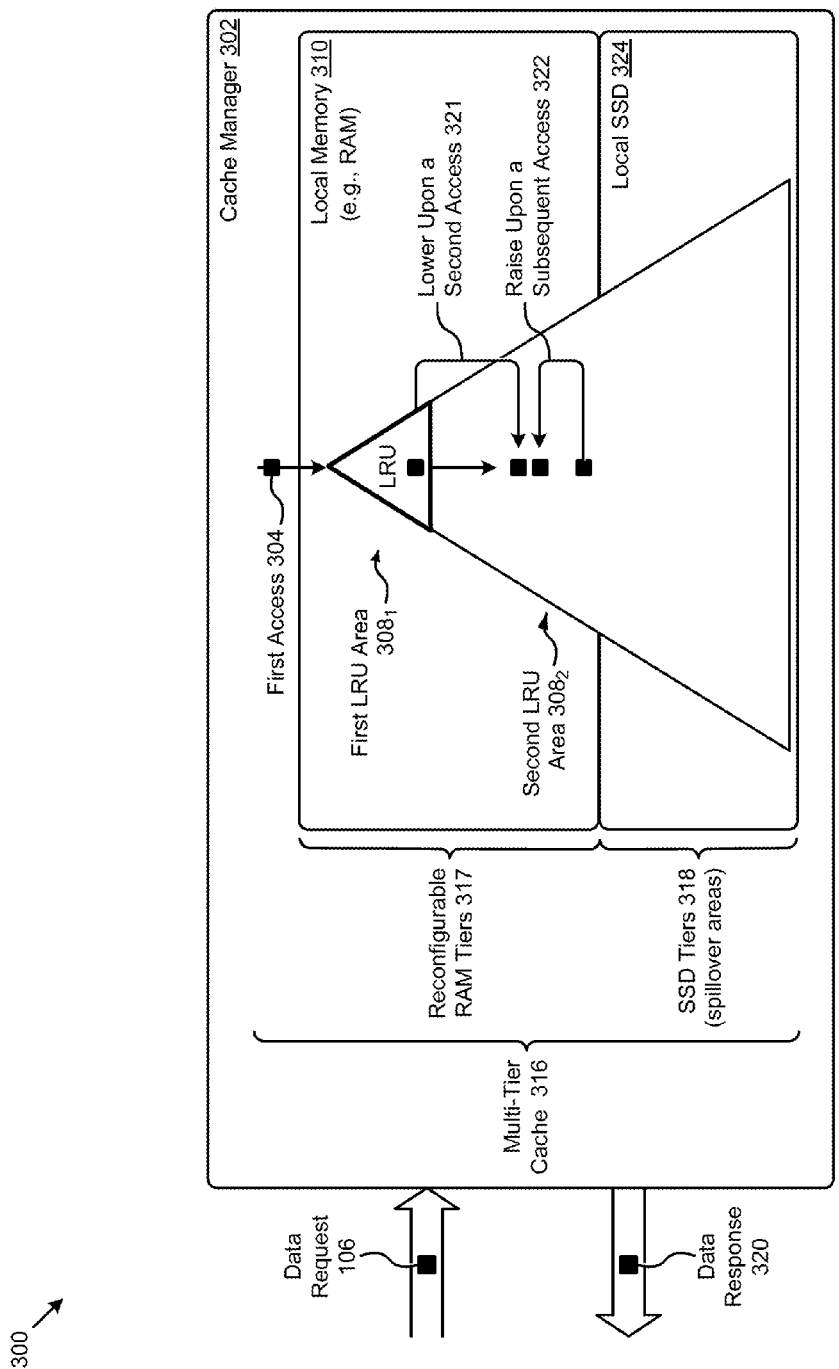
FIG. 3 depicts a multi-tier caching subsystem that implements a single-touch RAM tier, a multi-touch RAM tier, and an SSD spillover area, according to some embodiments.

FIG. 3 depicts a multi-tier caching subsystem 300 that implements a single-touch RAM tier, a multi-touch RAM tier, and an SSD spillover area. As an option, one or more variations of multi-tier caching subsystem 300 or any aspect thereof may be implemented in the context of the architecture and functionality of the embodiments described herein. Also, the multi-tier caching subsystem 300 or any aspect thereof may be implemented in any environment.

The embodiment shown in FIG. 3 implements a multi-tier cache 316 under control of a cache manager 302. The shown multi-tier cache includes reconfigurable RAM tiers 317 (e.g., which can be reconfigured dynamically to form tiers using local memory 310 and/or using any other accessible memory), as well as SSD tiers 318 that are formed of solid-state storage (e.g., local SSD 324).

A least recently used (LRU) algorithm is applied for a first LRU area $308_1$, and a similar (though not necessarily identical) LRU algorithm is applied for a second LRU area $308_2$. Entries are stored in the first LRU area upon first access (e.g., from a first access 304 stemming from a data request 106) and are moved to the second LRU area upon a second or Nth access. This serves to avoid the unintended consequence where a large amount of data is accessed once (e.g., by reading a file into memory), which could cause eviction of other data in the cache that might be repeatedly accessed. Accordingly, entries in the first LRU area are moved to the second LRU area upon a second access (e.g., see operation to lower upon a second access 321). In addition to performing the LRU algorithm over the second LRU area, subsequent accesses to an entry serve to promote the entry (e.g., see operation to raise upon a subsequent access 322), which entry or contents therefrom can in turn be provided to a caller via a data response 320.

Further details regarding general approaches to forming and operating a multi-tier cache are described in U.S. application Ser. No. 14/985,268 titled "SPONTANEOUS RECONFIGURATION OF DATA STRUCTURES USING BALLOON MEMORY ALLOCATION" filed Dec. 30, 2015, which is hereby incorporated by reference in its entirety.

The embodiment shown in FIG. 3 is merely one configuration. Other configurations are possible, some of which configurations are shown and described in the following figures. More particularly, some implementations of a multi-tier cache include RAM-based data structures for keys, which data structures can hold keys and pointers. Some implementations include data structures and operations over said data structures that implement "hot-cold" concepts and/or "head-tail" concepts. Some of such implementations are shown and described as follows.

FIG. 4A depicts key storage data structures 4A00 used in a multi-tier caching subsystem. As an option, one or more variations of key storage data structures 4A00 or any aspect thereof may be implemented in the context of the architecture and functionality of the embodiments described herein. Also, the key storage data structures 4A00 or any aspect thereof may be implemented in any environment.

The embodiment shown in FIG. 4A is merely one example to depict a data structure for key storage $402_1$, which key storage is composed of a key column (e.g., see key $K_A$, key $K_B$, key $K_N$, etc.), and a pointer (see the shown memory address references). When a data request comes in, the key storage is consulted and a HIT/MISS status is determined. In the case of a HIT (e.g., the key of the request matches a key in the key storage), then the pointer (e.g., a corresponding memory address reference) is used to access the content. The content can be stored in any tier (e.g., Tier1 $404_1$, Tier2 $404_2$, Tier3 $404_3$, . . . , TierN $404_N$). The tiers can be organized in a hierarchy so as to implement a "hot-cold" concept. More specifically, as time progresses, a cache entry might "age out" of a higher tier and be moved to a lower tier. In accordance with the regime described in the foregoing FIG. 3, a content item can be moved up to a higher tier (e.g., see the operation to raise upon a subsequent access 322), can be lowered to a lower tier, or can be spilled over into SSD tiers as accesses decreases and/or as new content is brought into a tier (e.g., thus causing eviction of an "old" content item to make room for a "new" content item).

A regime is shown and described as pertains to FIG. 4B for implementing the concepts of a single-touch tier (e.g., using a first LRU area $308_1$) in the presence of one or more multi-touch tiers (e.g., using one or more tiers formed in part by second LRU area $308_2$), and in the presence of a spillover area (e.g., using an SSD tier 318).

FIG. 4B depicts a solid-state storage device spillover tier 4B00 that is implemented using a block-oriented device. As an option, one or more variations of solid-state storage device spillover tier 4B00 or any aspect thereof may be implemented in the context of the architecture and functionality of the embodiments described herein. Also, the solid-state storage device spillover tier 4B00 or any aspect thereof may be implemented in any environment.

The shown spillover tier 406 is implemented using a block-oriented device such as the aforementioned spillover SSD 120. Further, and as shown, the key storage $402_2$ can include pointers to and from entries so as to facilitate low-cost entry and removal of keys (e.g., as the content entries corresponding to the keys "age out" or are otherwise evicted out of the caching system tiers). The concepts of this FIG. 4B can be combined with other aforementioned concepts to implement multiple tiers that each have a "head" end and a "tail" end that are used for certain insertion operations. One such regime is shown and described in the cache tiers of FIG. 4C.

FIG. 4C depicts cache tiers 4C00 that have respective head ends and tail ends as used in a caching system to manage entry, compaction, eviction and reclamation of small cache entries using a block-oriented cache tier. As an option, one or more variations of cache tiers 4C00 or any aspect thereof may be implemented in the context of the architecture and functionality of the embodiments described herein. Also, the cache tiers 4C00 or any aspect thereof may be implemented in any environment.

The embodiment shown in FIG. 4C includes a single-touch tier 408 (e.g., see tier1 $404_1$) and at least one multi-touch RAM tier 410. A source entry to spill 412 might be found at or near the tail of one of the multi-touch RAM tiers, and then, due to an "age-out" or other eviction, the source entry to spill 412 can be moved into the spillover SSD 120 (e.g., see target location in spillover area 414).

In some cases, the source entry to spill 412 can be a block that is of the same size as the natural block size of the spillover SSD 120. In other cases, the source entry to spill 412 can be a small entry. To avoid waste, any one or more of the herein-described techniques can be used to decrease or eliminate wasted space while also decreasing wasteful accesses to SSD tiers. One technique involving packing of multiple small entries into a block is further shown and described as pertaining to FIG. 4D.

FIG. 4D depicts small entry compaction operations 4D00 as performed in a caching system that manages entry, compaction, eviction and reclamation of small cache entries using a block-oriented cache tier. As an option, one or more variations of small entry compaction operations 4D00 or any aspect thereof may be implemented in the context of the architecture and functionality of the embodiments described herein. Also, the small entry compaction operations 4D00 or any aspect thereof may be implemented in any environment.

The embodiment shown in FIG. 4D is merely one example. Many variations in the described packing technique are possible.

Pack and Batch Evict

When adding an entry to a fully populated multi-touch RAM tier, a "bottom" entry is spilled to spillover SSD (however, in some cases the bottom entry might already be in spillover SSD). When a bottom entry is spilled to spillover SSD, it can be spilled over to the head end of the spillover SSD. For dealing with small entries, rather than pursuing a (wasteful) a single small entry spillover, the spillover operations can amalgamate multiple small entries into a block (e.g., of the natural block size of the SSD device). Such an operation can be implemented as follows:

Examine a set of small entries found at or near the tail end of the multi-touch RAM pool, and consider all—or a subset—of them as candidates to spill over into the spillover SSD.

Pack some or all of them in into one or more packed blocks of the natural block size of the SSD device. Not all candidates need to be packed for spilled over. In some cases a packing algorithm might choose to leave some of the entries in RAM (e.g., if they have a better chance of getting packed with some other entries when it comes to spill a next batch).

When observing the operations of the implementation above, a "strict" LRU order can be relaxed. Some reordering of entries that might violate a strict LRU order might serve the efficacy of the packing operations, and yet does not violate the overall intent of the LRU policy.

Consider the specific case as shown in FIG. 4D. Specifically, consider the case of entries in the multi-touch RAM tier as having the keys and sizes as given in Table 1.

TABLE 1

| Key | Value | Size of the Value |
|-----|-------|-------------------|
| K0  | V0    | 200 bytes         |
| K1  | V1    | 200 bytes         |
| K2  | V2    | 400 bytes         |
| K3  | V3    | 4K bytes          |
| K4  | V4    | 3100 bytes        |

In this example, the packing algorithm examines the set of entries found at or near the tail end of the multi-touch RAM and concluded that it is adequately efficient (or possibly optimally efficient) to pack them into two 4K blocks, one of which is packed with just block entry "V3", and the other block having entries {V0,V1,V2,V4}.

Concurrent with the packing algorithm, the keys of respective packed small entries are formed into a set of keys. In this example, the set of keys corresponds to keys {K0, K1, K2, K3, and K4}. The keys pertaining to the packed items are stored in the key storage, and respective pointers or pointer entries point to a data structure, comprising all or portions of a singly- or doubly-linked list of each individual key pertaining to its corresponding packed item and its offset from a memory pointer location. For example, such a data structure can comprise an SSD address or block number. One example of such a data structure shown and described as pertaining to FIG. 4E.

Figure 4E:
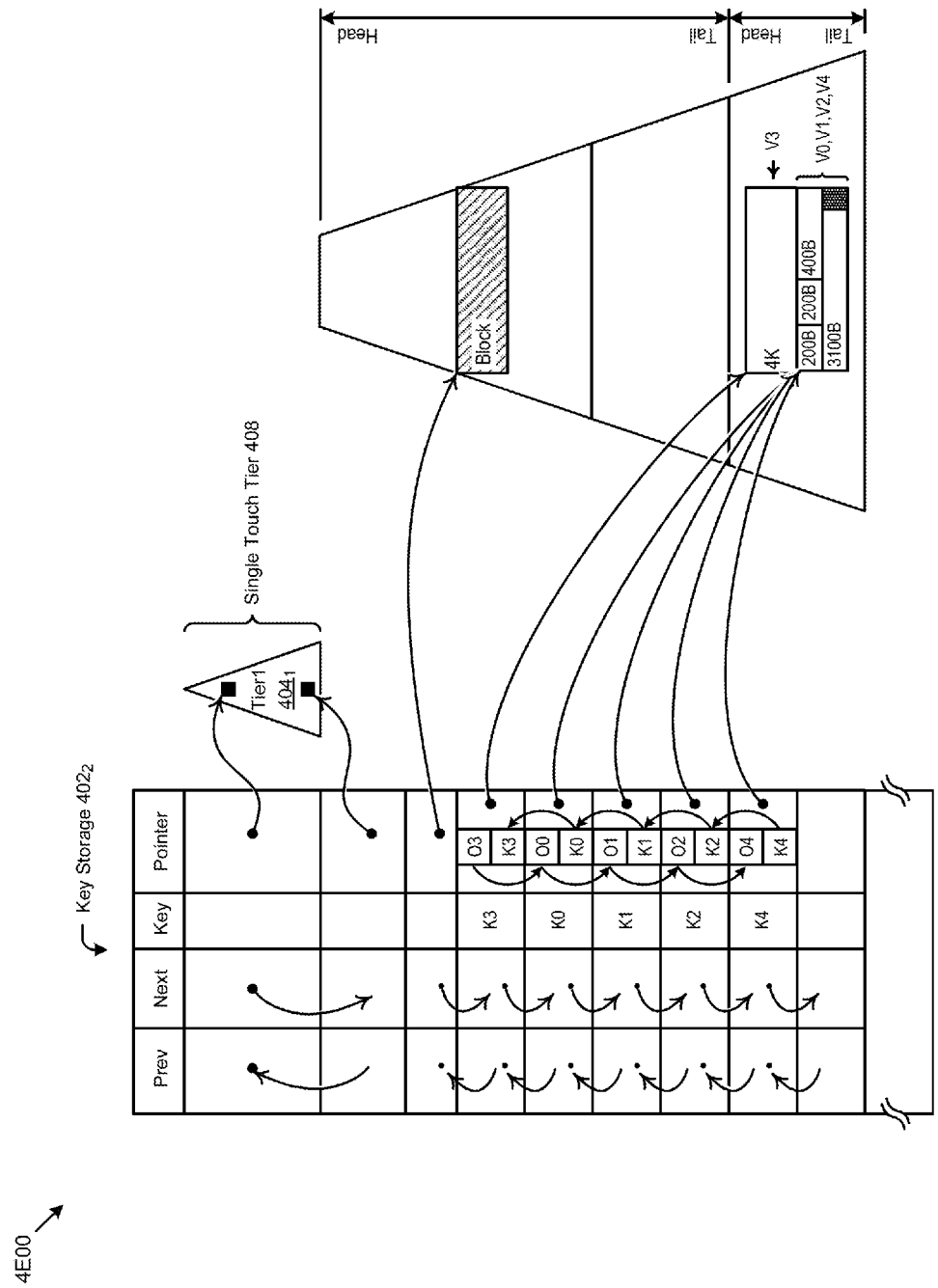
FIG. 4E depicts a packed block key construction operation as implemented within a caching system that manages entry, compaction, eviction and reclamation of small cache entries, according to an embodiment.

FIG. 4E depicts a packed block key construction operation 4E00 as implemented within a caching system that manages entry, compaction, eviction and reclamation of small cache entries. As an option, one or more variations of packed block key construction operation 4E00 or any aspect thereof may be implemented in the context of the architecture and functionality of the embodiments described herein. Also, the packed block key construction operation 4E00 or any aspect thereof may be implemented in any environment.

The embodiment shown in FIG. 4E is merely one example. As shown, the set of keys {K0, K1, K2, K4} has respective stored content values of {V0, V1, V2, V4}. As discussed above, those values have been packed together into a single SSD block that is pointed to by the keys {K0, K1, K2, K4}. The single- or doubly-linked data structure of individual key and respective offsets provide a way to efficiently get to any individual key in the set of keys. Accessing the keys that refer to respective stored content values can be facilitated by a hashing algorithm that resolves any key in the set of keys to the shown entry in the key storage $402_2$. As shown, the SSD memory location of any individual content item of a respective key (e.g., see keys {K0, K1, K2, K4}) can be known by the block location address plus that key's respective offset (e.g., {O0, O1, O2, O4}).

Over time, it is possible that the content corresponding to a member of a set of keys can be invalidated. Such invalidation can happen for many reasons; for example, a new value of the content is entered into a higher level of the cache subsystem, thus invalidating the older, overwritten, spilled-over contents for that key. Techniques for invalidation of contents, as well as techniques for keeping track of the number of still valid content entries, are given in the following FIG. 5.

Figure 5:
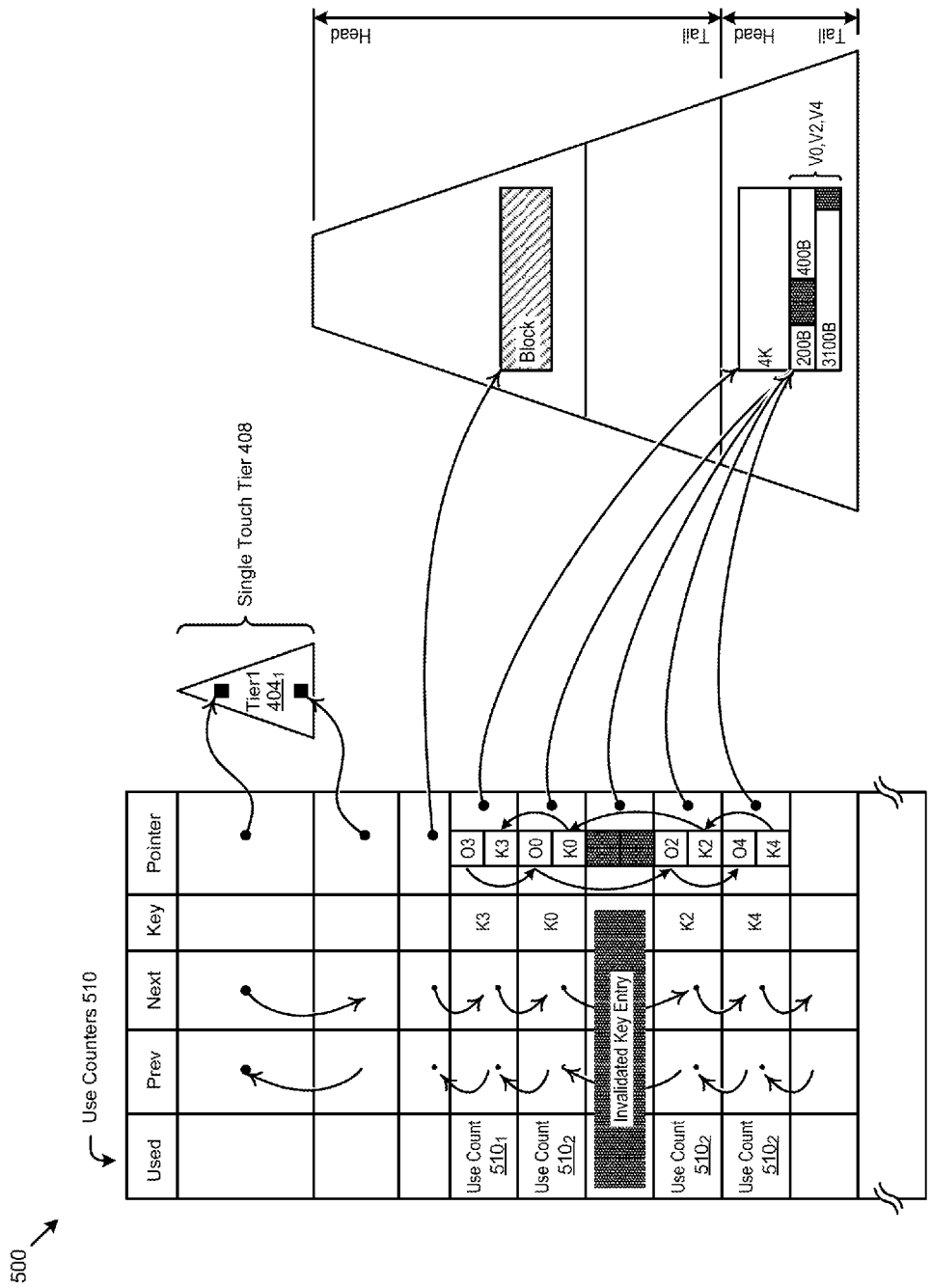
FIG. 5 exemplifies a small entry invalidation operation as implemented within a caching system that manages entry, compaction, eviction and reclamation of small cache entries using a block-oriented cache tier, according to an embodiment.

FIG. 5 exemplifies a small entry invalidation operation 500 as implemented within a caching system that manages entry, compaction, eviction and reclamation of small cache entries using a block-oriented cache tier. As an option, one or more variations of small entry invalidation operation 500 or any aspect thereof may be implemented in the context of the architecture and functionality of the embodiments described herein. Also, the small entry invalidation operation 500 or any aspect thereof may be implemented in any environment.

Garbage Collection after Small Entry Content Invalidation

The embodiment shown in FIG. 5 is merely one example. This example follows the example of FIG. 4E, and includes the case of invalidation due to overwrite. Specifically, the invalidation (e.g., due to overwrite) has the effect of reducing the effective utilization of the block into which the now invalidated small entry was packed during the spillover operations. Such utilization metrics can be tracked in many ways. One technique involves maintaining use counters 510 (e.g., see use count $510_1$ and use count $510_2$) that tracks the number of sub-chunks (e.g., small entries) that remain as valid, or at least not invalidated in the respective packet block. In operation, when a small entry that is part of a packed SSD block is overwritten or otherwise invalidated, the copy of the small entry that is part of a packed SSD block becomes "garbage". Also, when a key "ages out" from the spillover SSD, its corresponding SSD portion becomes "garbage". Such events (e.g., invalidation due to overwrites or due to "age out") cause fragmentation within the page. The use counters 510 serve to track the number (e.g., a key count) or extent (e.g., a number of bytes) of valid small entries that are packed in a spillover SSD block.

Use counters can be managed in several ways:
- In one embodiment, when a use counter is equal to '1' (e.g., indicating that there is only one entry in the respective packed spillover SSD block), and that entry is invalidated, then the corresponding spillover SSD block can be referenced in a free list.
- In one embodiment when a use counter is decremented down to '0' (e.g., indicating that there is no longer any valid entry in the respective packed spillover SSD block), then the corresponding spillover SSD block can be referenced in a free list.
- In one embodiment, multiple use counters are maintained in parallel, with one instance of a value per entry (e.g., see use count $510_1$ and the several occurrences of use count $510_2$). In another embodiment only one use count value is maintained for any linked list (e.g., linked list from K3, to K0, to K2, to K4), possibly at the head of the linked list (e.g., at the row corresponding to K3), or possibly at the tail of the linked list.
- In one embodiment when a use counter is decremented down to '0' (e.g., there is no longer any valid entry in the respective packed spillover SSD block), then an occurrence of a '0' in the use counter can be used as a signal to a garbage collection process, which signal may cause the garbage collection process to place the spillover SSD block into a free list.

As pertaining to tracking the extent of small entries, use indicators or other tracking values can maintain usage by updating such a use indicator with a byte count or number of sub-chunks (e.g., 128 bytes). The use counter tracks the number of valid keys or the amount of free sub-chunks in a packed block. In some embodiments, the actual location(s) of valid (or invalid) or used (or free) items within the block need not be tracked. As is discussed in the following, some embodiments perform defragmentation by moving surviving small entries into a higher tier, and in doing so the block over which the defragmentation operation is performed becomes free for subsequent uses (e.g., as a block location for target location in spillover area).

Strictly as one example, for a 4K block, a 5-bit use counter can track how many 128 sub-chunks are free. In some embodiments, use counters can be maintained as a simple byte array indexed by the SSD block number. The RAM memory space requirement for a 5-bit use counter would be less than about 3 MB so as to account for a 20 G spillover SSD cache tier. In another example, if an 8-bit use counter is used, the use counter would consume about 5 MB (to account for a 20 G spillover SSD cache tier).

During the course of operation, a subject block's use counter is updated as keys are evicted or invalidated.

Updating the Keys after Small Entry Content Invalidation

When a particular key's SSD space is no longer valid (due to an overwrite event or an eviction event), the node corresponding to this key should be removed from the set of keys. Removal can be accomplished in many ways such as by marking the data as invalid (e.g., by clearing it) and/or by managing the linked list data structure that comprises a singly- or doubly-linked list of each key and its offset. As shown in FIG. 5, the content for key K1 is deemed to be invalidated, and the key entry as well as the linked list data structure is updated to show such an invalidation.

In some cases a key and its respective content (e.g., a small entry) that became cold or for other reasons was spilled over into spillover SSD might one again be accessed, and thus become hot or otherwise be subject to a page-in operation to bring in the small entry from spillover SSD to a multi-touch tier. Techniques to handle a page-in operation are given in FIG. 6.

Figure 6:
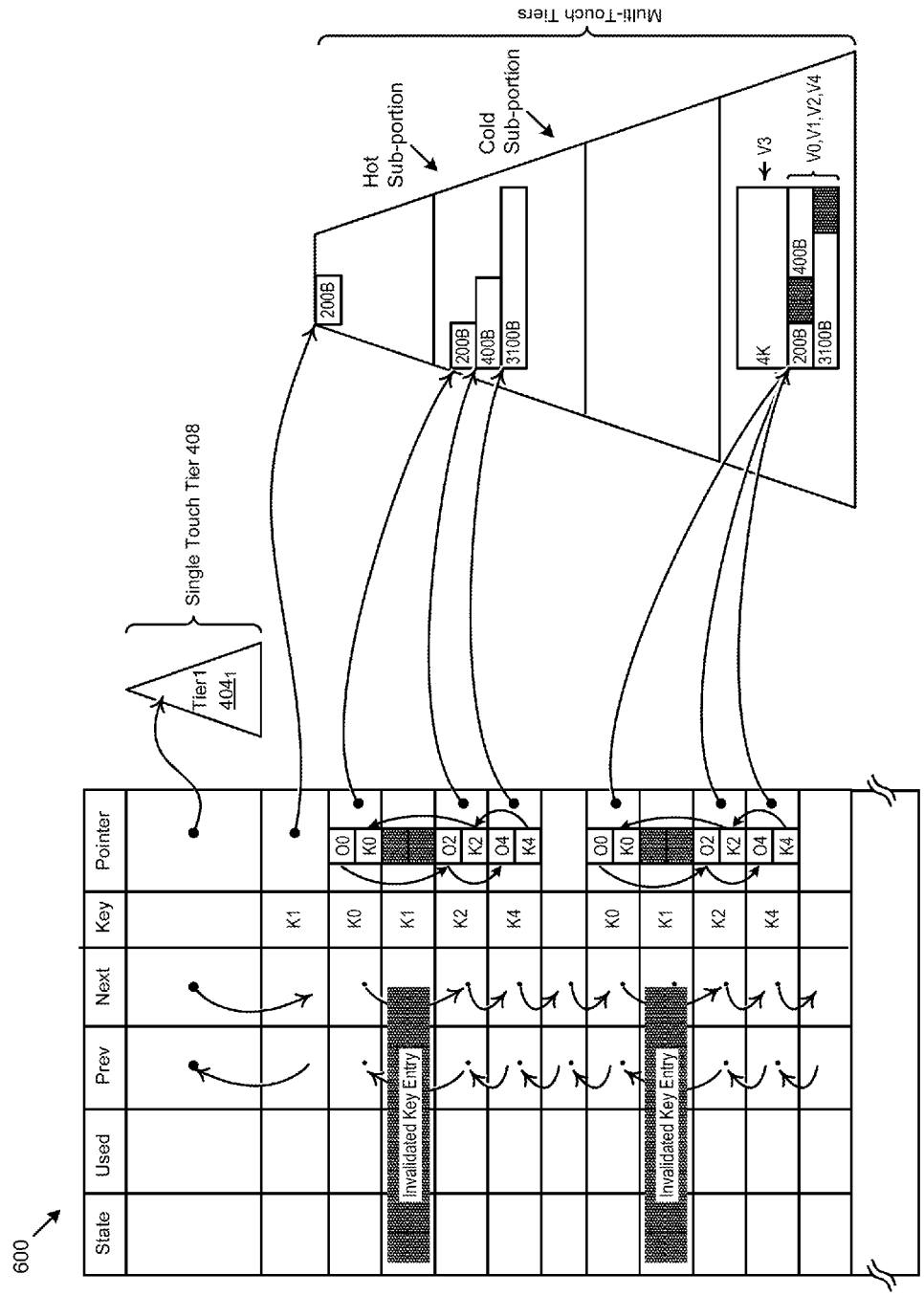
FIG. 6 depicts a small entry block page-in operation as implemented within a caching system to manage entry, compaction, eviction and reclamation of small cache entries using a block-oriented cache tier, according to an embodiment.

FIG. 6 depicts a small entry block page-in operation 600 as implemented within a caching system to manage entry, compaction, eviction and reclamation of small cache entries using a block-oriented cache tier. As an option, one or more variations of small entry block page-in operation 600 or any aspect thereof may be implemented in the context of the architecture and functionality of the embodiments described herein. Also, the small entry block page-in operation 600 or any aspect thereof may be implemented in any environment.

Page-In from Flash

When a small entry is paged in from spillover SSD (e.g., due to a new access via its key), a copy of the small entry is inserted into the hot end (e.g., see hot sub-portion) of one of the multi-touch RAM tiers. This event can be processed so as to serve as a garbage collection and/or reclamation technique. Specifically, for the other small entries that are packed into the same block as the newly paged-in key(s), and since the packed block is to be read to retrieve the newly-accessed small entry content, one embodiment can bring in all of the small entry content of that block into a higher tier. As shown, only the particular, newly accessed content is added to the hot end of the multi-touch RAM tier. The remaining small entries of the respective keys are added to a multi-touch RAM tier using a midpoint insertion strategy within the multi-touch RAM tier. In some cases, one or more of the small entries of the set of keys might already be in a multi-touch RAM tier (e.g., due to an overwrite event or other event). To accommodate such a midpoint insertion operation, any tier among the several multi-touch RAM tiers can be divided into two sub-portions, namely a hot sub-portion and a cold sub-portion. The concepts of the single-touch tier in relation to a multi-touch tier can be accommodated in parallel with the aforementioned sub-portions. Strictly as one example, a multi-tier caching subsystem that implements both a single-touch tier and one or more multi-touch tiers can be partitioned as shown in Table 2.

TABLE 2

| Usage Model | Apportionment |
| --- | --- |
| Single Touch Area | 20% |
| Multi-touch RAM Hot Sub-portion | 60% |
| Multi-touch- RAM Cold Sub-portion | 20% |

As shown, the key being looked up (e.g., looked-up small entry corresponding to key K0) is inserted into the hot end of the multi-touch RAM hot sub-list. The remaining valid keys in the block, if not already in multi-touch RAM, will be inserted at a midpoint (e.g., at the hot end of the multi-touch RAM cold sub-list).

Other embodiments are possible and have varying performance characteristics. Strictly as one other possibility, new accesses to a spilled-over small entry can be inserted together with all of the other keys in the set of keys. In some cases the insertion of all of the other keys in the set of keys can be entered into the single-touch pool, or the insertion of all of the other keys in the set of keys can be entered into the multi-touch pool.

In some embodiments, pointers to small entries in a spillover SSD block can be referenced using a block ID or block number and an offset. In some other embodiments, pointers to small entries in a spillover SSD block can be referenced using an absolute address. In still other embodiments (for example, for SSD devices that are accessed by extents comprising multiple blocks), then the pointers to small entries in a spillover SSD block can be referenced using an SSD extent number and/or a block offset and/or a byte offset.

Figure 7:
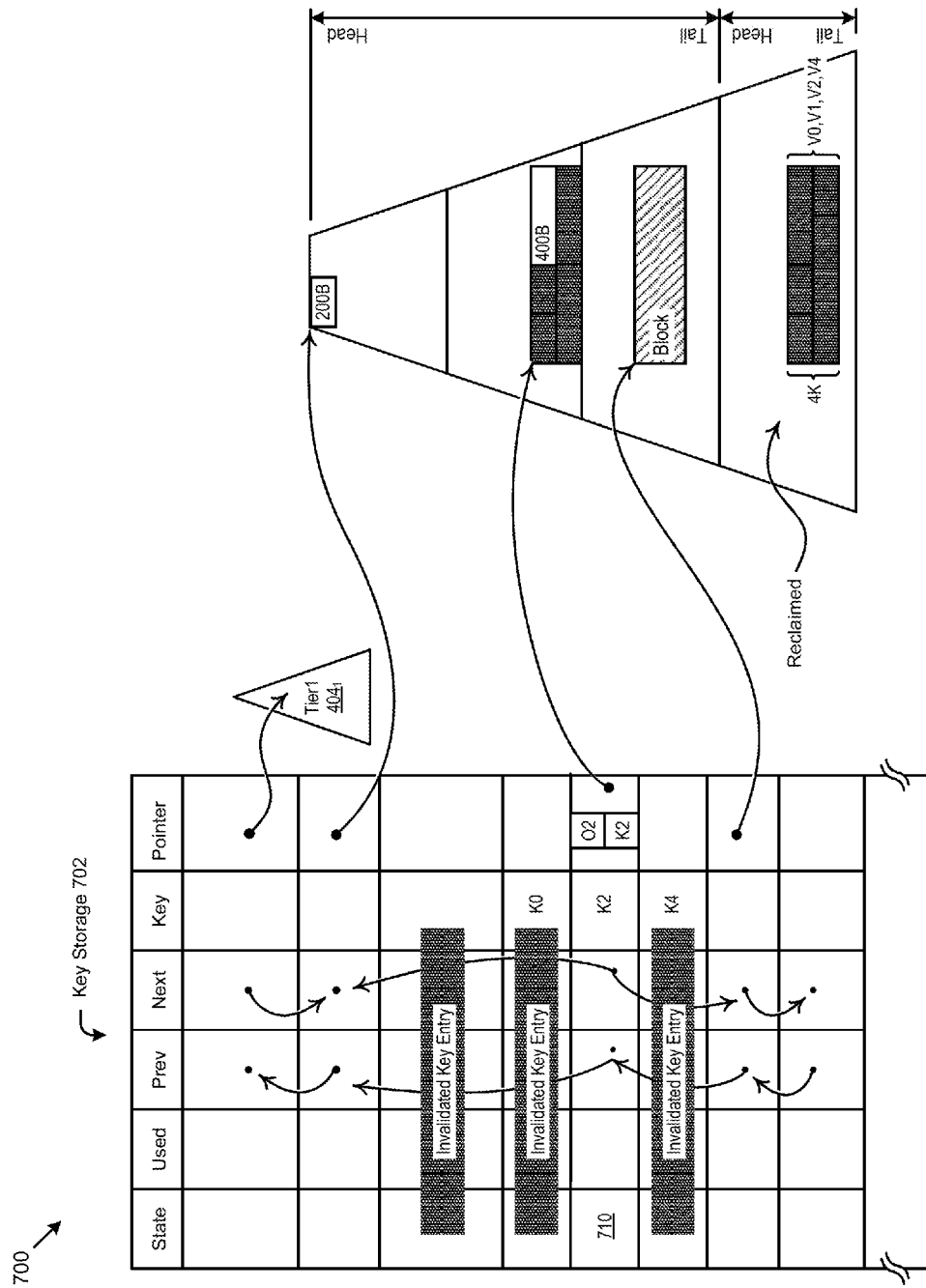
FIG. 7 depicts a small entry block defragmentation operation as implemented within a caching system to manage entry, compaction, eviction and reclamation of small cache entries using a block-oriented cache tier, according to an embodiment.

FIG. 7 depicts a small entry block defragmentation operation 700 as implemented within a caching system to manage entry, compaction, eviction and reclamation of small cache entries using a block-oriented cache tier. As an option, one or more variations of small entry block defragmentation operation 700 or any aspect thereof may be implemented in the context of the architecture and functionality of the embodiments described herein. Also, the small entry block defragmentation operation 700 or any aspect thereof may be implemented in any environment.

Defragmenting Packed Pages

In situations when all of the small entries of a packed block age out of the spillover SSD, the corresponding block usage counter (see FIG. 6) will be updated to reflect that there are no longer any valid small entries and/or that no bytes or sub-blocks are valid, then at that point, the block can be returned back to the free list. However, if a subset of small entries survive in the packed block, then the block may exhibit low utilization (e.g., holes). A defragmentation operation can be implemented to manage out the small entry or entries, and thus reclaim the space. As described above, when a packed block is brought in from spillover SSD to a RAM tier, the spillover SSD copies of the small entry content is retained in spillover SSD. This policy avoids the need to write again to the spillover SSD in the case that small entry content ages out of RAM.

One possibility to facilitate garbage collection is to check the usage counter of the packed page at the time of paging in a key on that page to determine if the use counter has dropped to (or below) a certain threshold and, if so, release the entire SSD block to the free list. Before releasing the entire SSD block an update operation is commenced. The update operation checks the valid keys in the set of keys and, for each such entry, the update operation updates respective data items in the key storage 702 (e.g., see the "State" column) so as to mark the fact that the respective key(s) is/are no longer backed in spillover SSD (see indicators for not backed in SSD 710). Subsequently, when any of these keys age out from a multi-touch RAM tier, then they get re-packed with other keys and thus would once again be backed in spillover SSD as a result of the spillover operations.

In some cases, there is no need for background compactions or scans of the cache so as to reclaim space. Compaction and reclamation can often be performed as a result of the events and operations that occur within the herein-described caching system to manage entry, compaction, eviction and reclamation of small cache entries using a block-oriented cache tier.

Additional Embodiments of the Disclosure

Additional Practical Application Examples

Figure 8:
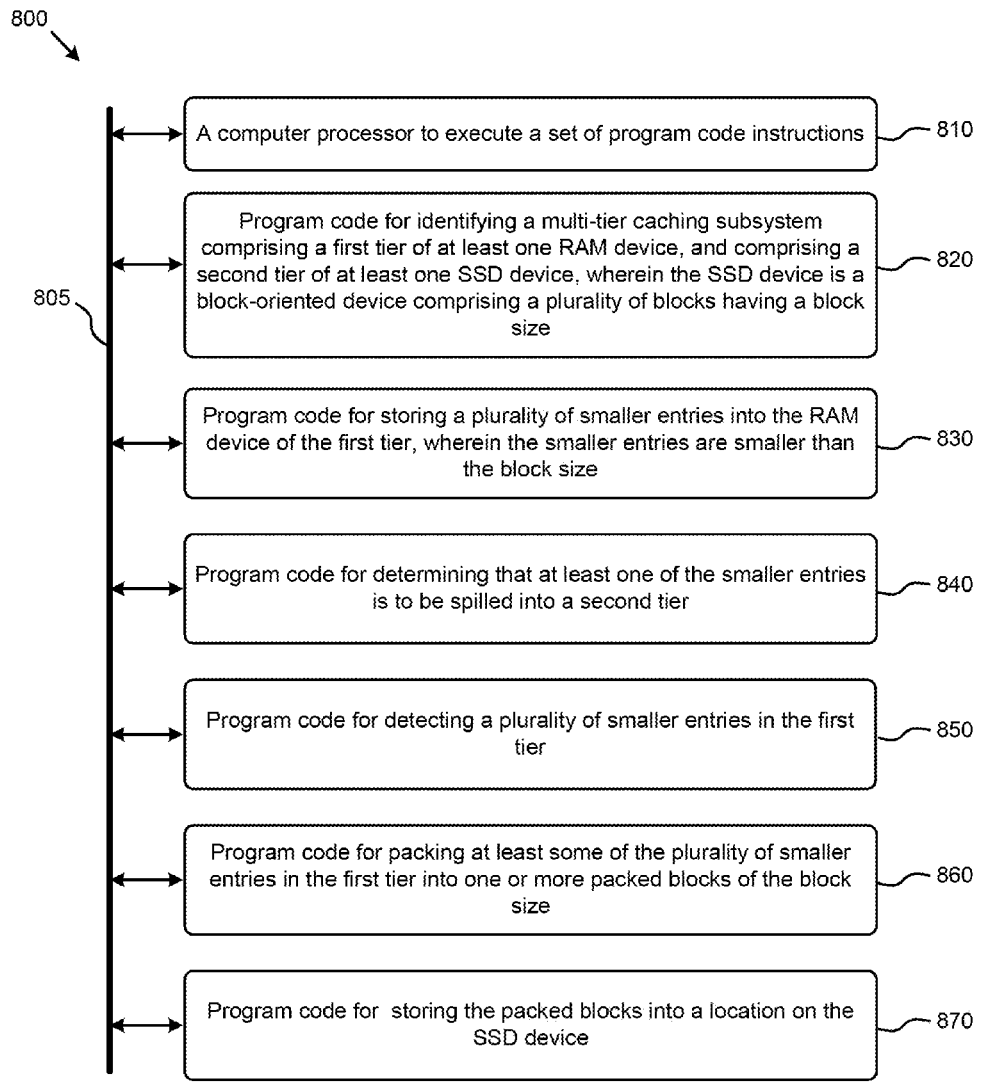
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment. The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims. The shown embodiment implements a portion of a computer system, presented as system 800, comprising a computer processor to execute a set of program code instructions (see module 810) and modules for accessing memory to hold program code instructions to perform: identifying a multi-tier caching subsystem comprising a first tier of at least one RAM device, and comprising a second tier of at least one SSD device, wherein the SSD device is a block-oriented device comprising a plurality of blocks having a block size (see module 820); storing a plurality of smaller entries into the RAM device of the first tier, wherein the smaller entries are smaller than the block size (see module 830); determining that at least one of the smaller entries is to be spilled into a second tier (see module 840); detecting a plurality of smaller entries in the first tier (see module 850); packing at least some of the plurality of smaller entries in the first tier into one or more packed blocks of the block size (see module 860); and storing the packed blocks into a location on the SSD device (see module 870).

System Architecture Overview

Additional System Architecture Examples

Figure 9A:
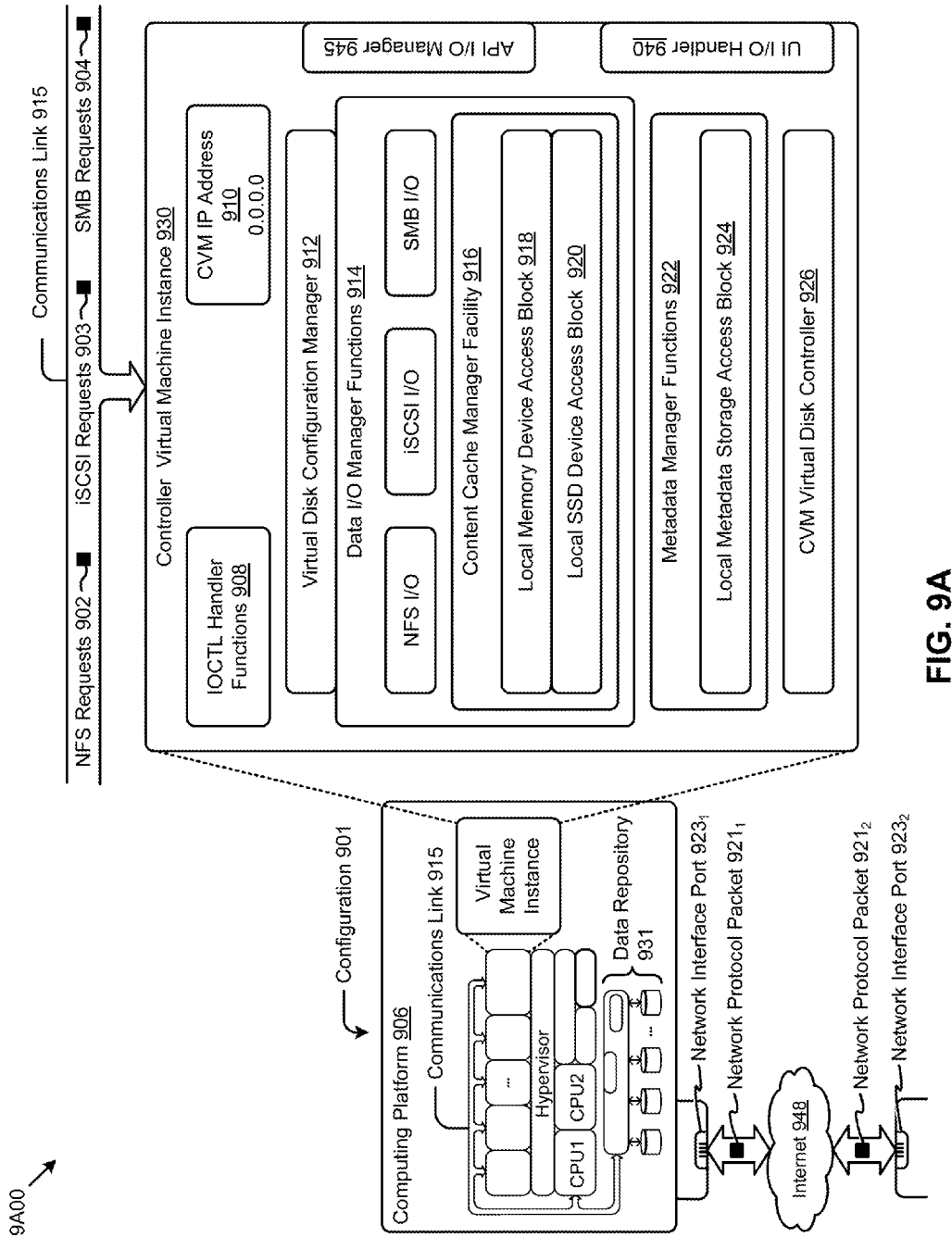
FIG. 9A and FIG. 9B depict architectures comprising collections of interconnected components suitable for implementing embodiments of the present disclosure and/or for use in the herein-described environments.

FIG. 9A depicts a virtual machine architecture 9A00 comprising a collection of interconnected components suitable for implementing embodiments of the present disclosure and/or for use in the herein-described environments. The shown virtual machine architecture 9A00 includes a virtual machine instance in a configuration 901 that is further described as pertaining to the controller virtual machine instance 930. A controller virtual machine instance receives block I/O storage requests as of network file system (NFS) requests in the form of NFS requests 902, and/or internet small computer storage interface (iSCSI) block I/O requests in the form of iSCSI requests 903, and/or Samba file system requests (SMB) in the form of SMB requests 904. The controller virtual machine instance publishes and responds to an internet protocol (IP) address (e.g., see CVM IP address 910. Various forms of input and output (I/O) can be handled by one or more I/O control handler IOCTL handler functions 908 that interface to other functions such as data I/O manager functions 914, metadata manager functions 922. As shown, the data I/O manager functions can include communication with a virtual disk configuration manager 912, and/or can include direct or indirect communication with any of various block I/O functions (e.g., NFS I/O, iSCSI I/O, SMB I/O, etc.).

In addition to block I/O functions, the configuration 901 supports I/O of any form (e.g., block I/O, streaming I/O, packet-based I/O, HTTP traffic, etc.) through either or both of a user interface (UI) handler such as UI I/O handler 940 and/or through any of a range of application programming interfaces (APIs), possibly through the shown API I/O manager 945.

The communications link 915 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packet handling (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes, for example, solid-state storage devices (SSD), or optical or magnetic disks such as disk drives or tape drives. Volatile media includes dynamic memory such as a random access memory. As shown, the controller virtual machine instance 930 includes a content cache manager facility 916 that accesses storage locations, possibly including local DRAM (e.g., through the local memory device access block 918) and/or possibly including accesses to local solid-state storage (e.g., through local SSD device access block 920).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). An external data repository 931, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 924. The external data repository 931, can be configured using a CVM virtual disk controller 926, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 901 can be coupled by a communications link 915 (e.g., backplane, LAN, PTSN, wired or wireless network, etc.) and each instance may perform respective portions of sequences of instructions as may be required to practice embodiments of the disclosure The shown computing platform 906 is interconnected to the Internet 948 through one or more network interface ports (e.g., network interface port $923_1$ and network interface port $923_2$). The configuration 901 ca be addressed through one or more network interface ports using an IP address. Any operational element within computing platform 906 can perform sending and receiving operations using any of a range of network protocols, possibly including network protocols that send and receive packets (e.g., see network protocol packet $921_1$ and network protocol packet $921_2$).

The computing platform 906 may transmit and receive messages that can be composed of configuration data, and/or any other forms of data and/or instructions organized into a data structure (e.g., communications packets). In some cases, the data structure includes program code instructions (e.g., application code), communicated through Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or results of executing program code can be delivered to a particular user via a download (e.g., a download from the computing platform 906 over the Internet 948 to an access device).

The configuration 901 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of a caching system to manage entry, compaction, and eviction of small cache entries using a block-oriented cache tier.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement a caching system to manage entry, compaction, and eviction of small cache entries using a block-oriented cache tier). Such files or records can be brought into and/or stored in volatile or non-volatile memory.

Figure 9B:
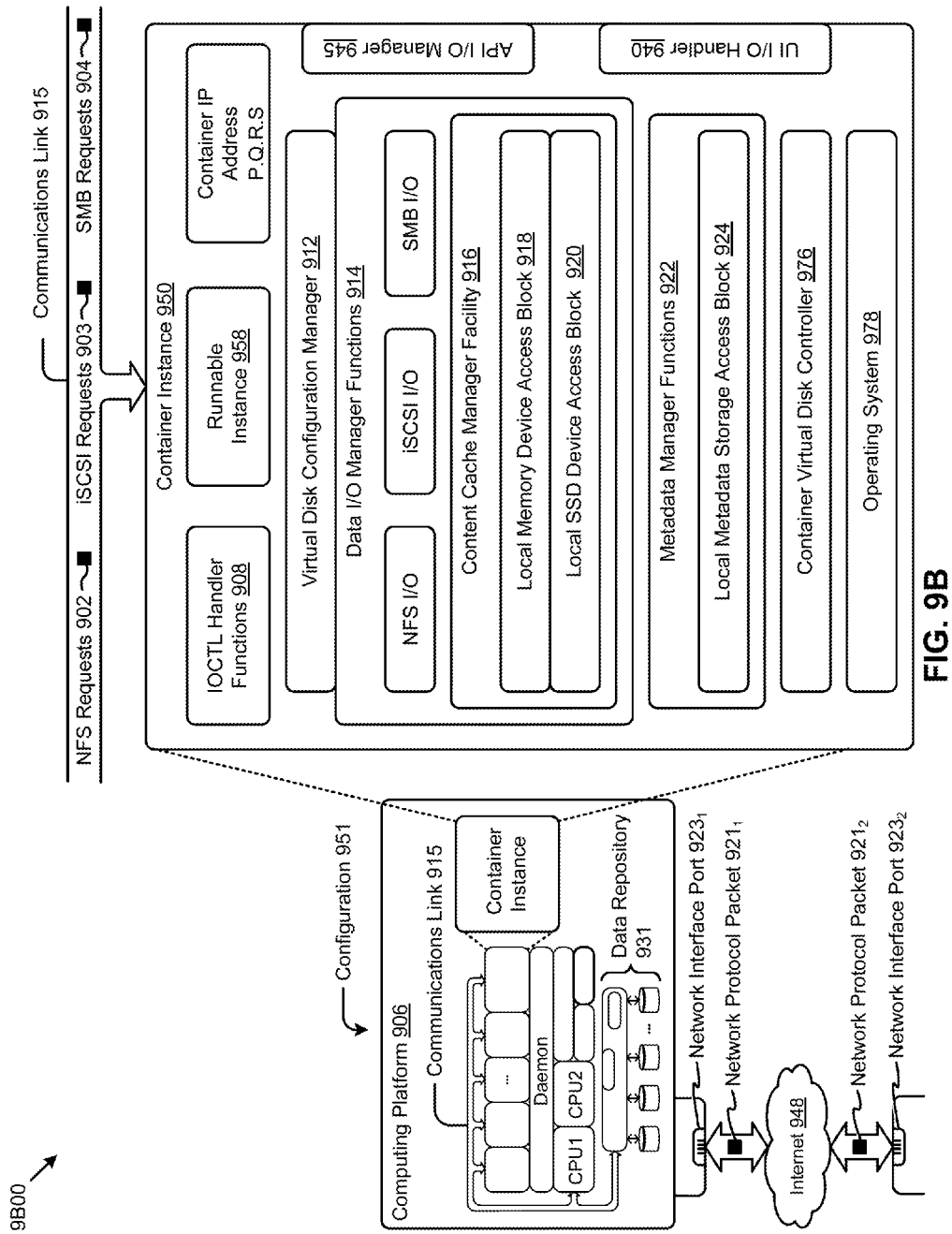

FIG. 9B depicts a containerized architecture 9B00 comprising a collection of interconnected components suitable for implementing embodiments of the present disclosure and/or for use in the herein-described environments. The shown containerized architecture 9B00 includes a container instance in a configuration 951 that is further described as pertaining to the container instance 950. The configuration 951 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls -a", etc.). The container might optionally include an operating system 978, however such an operating system need not be provided. Instead, a container can include a runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data I/O management functions, etc. In some cases, a runnable instance includes code for, and access to a container virtual disk controller 976. Such a container virtual disk controller can perform any of the functions that the aforementioned CVM virtual disk controller 926, yet such a container virtual disk controller does not rely on a hypervisor or any particular operating system for performing its range of functions.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
identifying a multi-tier caching system comprising a first tier and a second tier, the first tier comprising a subset addressable storage media accessed using a random access address on a subset by subset basis and the second tier comprises a input/output (I/O) block addressable storage media accessed using an I/O block address on a I/O block by I/O block basis, wherein a size of the I/O block is at least a multiple of a size of the subset, and the multi-tier caching system is managed by at least maintaining a location map comprising a plurality of records that map a set of keys to a set of locations of multiple tiers of the multi-tier caching system;

storing a plurality of entries into the first tier corresponding to at least one or more subsets, wherein at least some of the plurality of entries are smaller than the size of the I/O block, and storing the plurality of entries into the first tier further comprises generating one or more records in the location map corresponding to the one or more subsets, wherein the one or more records map one or more corresponding keys to one or more locations of the subset addressable storage media;

determining that an entry of the at least some of the plurality of entries smaller than the size of the I/O block is to be spilled into a second tier, the entry corresponding to a record of the one or more records in the location map;

packing the entry of the at least some of the plurality of entries smaller than the size of the I/O block with one or more additional entries from the first tier into a packed block the size of the I/O block, wherein packing the entry with one or more additional entries comprises at least selecting the entry and the one or more additional entries using the location map; and storing the packed block as an I/O block into an I/O block location on the second tier, wherein storing the packed block further comprises updating one or more records in the location map corresponding the packed block to map a corresponding key to a block location and an offset corresponding to respective entry locations within the block location.

2. The method of claim 1, further comprising updating a data structure to indicate the I/O block location.

3. The method of claim 1, further comprising maintaining one or more use indicators that store one or more utilization metrics of respective packed blocks.

4. The method of claim 3, further comprising evicting at least one of the at least some of the plurality of entries smaller than the size of the I/O block by copying at least one of the respective packed blocks to a point in a random access device.

5. The method of claim 4, wherein the point in a random access device is a midpoint of the first tier.

6. The method of claim 3, further comprising detecting that at least one of the one or more utilization metrics of at least one of the respective packed blocks indicates a utilization that is lower than a threshold.

7. The method of claim 6, further comprising detecting when the utilization indicates zero utilization of the at least one of the respective packed blocks and marking the at least one of the respective packed blocks as a free block.

8. The method of claim 6, further comprising detecting when the utilization that is lower than the threshold also indicates non-zero utilization of the at least one of the respective packed blocks.

9. The method of claim 8, further comprising by copying at least one of the respective packed blocks to a point in a random access device.

10. The method of claim 8, further comprising updating a data structure to indicate a RAM device location of one or more smaller entries that were copied to a random access device.

11. A non-transitory computer readable medium having stored thereon a sequence of instructions which, when stored in memory and executed by a processor causes the processor to perform a set of acts, the set of acts comprising:
identifying a multi-tier caching system comprising a first tier and a second tier, the first tier comprising a subset addressable storage media accessed using a random access address on a subset by subset basis and the second tier comprises a input/output (I/O) block addressable storage media accessed using an I/O block address on a I/O block by I/O block basis, wherein a size of the I/O block is at least a multiple of a size of the subset, and the multi-tier caching system is managed by at least maintaining a location map comprising a plurality of records that map a set of keys to a set of locations of multiple tiers of the multi-tier caching system;

storing a plurality of entries into the first tier corresponding to at least one or more subsets, wherein at least some of the plurality of entries are smaller than the size of the I/O block, and storing the plurality of entries into the first tier further comprises generating one or more records in the location map corresponding to the one or more subsets, wherein the one or more records map one or more corresponding keys to one or more locations of the subset addressable storage media;

determining that an entry of the at least some of the plurality of entries smaller than the size of the I/O block is to be spilled into a second tier, the entry corresponding to a record of the one or more records in the location map;

packing the entry of the at least some of the plurality of entries smaller than the size of the I/O block with one or more additional entries from the first tier into a packed block the size of the I/O block, wherein packing the entry with one or more additional entries comprises at least selecting the entry and the one or more additional entries using the location map; and storing the packed block as an I/O block into an I/O block location on the second tier, wherein storing the packed block further comprises updating one or more records in the location map corresponding the packed block to map a corresponding key to a block location and an offset corresponding to respective entry locations within the block location.

12. The computer readable medium of claim 11, further comprising instructions which, when stored in memory and executed by the processor causes the processor to perform acts of updating a data structure to indicate the I/O block location.

13. The computer readable medium of claim 11, further comprising instructions which, when stored in memory and executed by the processor causes the processor to perform acts of maintaining one or more use indicators that store one or more utilization metrics of respective packed blocks.

14. The computer readable medium of claim 13, further comprising instructions which, when stored in memory and executed by the processor causes the processor to perform acts of evicting at least one of the at least some of the plurality of entries smaller than the size of the I/O block by copying at least one of the respective packed blocks to a point in a random access device.

15. The computer readable medium of claim 14, wherein the point in a random access device is a midpoint of the first tier.

16. The computer readable medium of claim 13, further comprising instructions which, when stored in memory and executed by the processor causes the processor to perform acts of detecting that at least one of the one or more utilization metrics of at least one of the respective packed blocks indicates a utilization that is lower than a threshold.

17. The computer readable medium of claim 16, further comprising instructions which, when stored in memory and executed by the processor causes the processor to perform acts of detecting when the utilization indicates zero utilization of the at least one of the respective packed blocks and marking the at least one of the respective packed blocks as a free block.

18. The computer readable medium of claim 16, further comprising instructions which, when stored in memory and executed by the processor causes the processor to perform acts of detecting when the utilization that is lower than the threshold also indicates non-zero utilization of the at least one of the respective packed blocks.

19. A system comprising:
a non-transitory storage media having stored thereon a sequence of instructions; and
a processor or processors that execute the instructions to cause the processor or processors to perform a set of acts, the set of acts comprising:
identifying a multi-tier caching system comprising a first tier and a second tier, the first tier comprising a subset addressable storage media accessed using a random access address on a subset by subset basis and the second tier comprises a input/output (I/O) block addressable storage media accessed using an I/O block address on a I/O block by I/O block basis, wherein a size of the I/O block is at least a multiple of a size of the subset, and the multi-tier caching system is managed by at least maintaining a location map comprising a plurality of records that map a set of keys to a set of locations of multiple tiers of the multi-tier caching system;

storing a plurality of entries into the first tier corresponding to at least one or more subsets, wherein at least some of the plurality of entries are smaller than the size of the I/O block, and storing the plurality of entries into the first tier further comprises generating one or more records in the location map corresponding to the one or more subsets, wherein the one or more records map one or more corresponding keys to one or more locations of the subset addressable storage media;

determining that an entry of the at least some of the plurality of entries smaller than the size of the I/O block is to be spilled into a second tier, the entry corresponding to a record of the one or more records in the location map;

packing the entry of the at least some of the plurality of entries smaller than the size of the I/O block with one or more additional entries from the first tier into a packed block the size of the I/O block, wherein packing the entry with one or more additional entries comprises at least selecting the entry and the one or more additional entries using the location map; and storing the packed block as an I/O block into an I/O block location on the second tier, wherein storing the packed block further comprises updating one or more records in the location map corresponding the packed block to map a corresponding key to a block location and an offset corresponding to respective entry locations within the block location.

20. The system of claim 19, further comprising a data structure to maintain one or more use indicators that store one or more utilization metrics of respective packed blocks.

* * * * *